United States Patent
Heller et al.

(10) Patent No.: US 9,354,709 B1
(45) Date of Patent: May 31, 2016

(54) TILT GESTURE DETECTION

(71) Applicant: Amazon Technologies, Inc., Reno, NV (US)

(72) Inventors: Geoffrey Scott Heller, Seattle, WA (US); Kritarth Jain, Seattle, WA (US); Louis LeRoi LeGrand, III, Seattle, WA (US); Ross David Roessler, Seattle, WA (US); Paul Aksenti Savastinuk, Shoreline, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/306,771

(22) Filed: Jun. 17, 2014

(51) Int. Cl.
*G06F 3/01* (2006.01)
*G06F 1/16* (2006.01)

(52) U.S. Cl.
CPC .............. *G06F 3/017* (2013.01); *G06F 1/1694* (2013.01)

(58) Field of Classification Search
None
See application file for complete search history.

(56) References Cited

U.S. PATENT DOCUMENTS

| | | | |
|---|---|---|---|
| 8,228,292 B1 * | 7/2012 | Ruiz et al. ...................... | 345/156 |
| 8,644,884 B2 * | 2/2014 | Sheynblat et al. ............ | 455/566 |
| 2008/0062001 A1 * | 3/2008 | Hsu et al. ....................... | 340/689 |
| 2009/0303204 A1 * | 12/2009 | Nasiri et al. ................... | 345/184 |
| 2015/0091841 A1 * | 4/2015 | Lewis et al. .................... | 345/174 |

* cited by examiner

*Primary Examiner* — Seokyun Moon
(74) *Attorney, Agent, or Firm* — Seyfarth Shaw LLP; Ilan N. Barzilay; Joseph M. Walker

(57) ABSTRACT

A device may recognize a tilt gesture when a device rotates about an axis and then back again. The gesture may be recognized using a state machine. Recognition of the gesture may be performed based on a context of a device, where the specific movement of the device during a tilt gesture may change based on the context. The tilt gesture may be confirmed using a classifier trained on features describing the gesture and the context.

20 Claims, 20 Drawing Sheets

TILT GESTURE DETECTION

BACKGROUND

Handheld electronic devices regular include navigation capability and often include features to determine device orientation or other internal sensors. Some devices have multiple radios, including WiFi and Bluetooth. Many also provide a graphical user interface (GUI) and touch screen via which the user may interact with the GUI.

BRIEF DESCRIPTION OF THE DRAWINGS

For a more complete understanding of the present disclosure, reference is now made to the following description taken in conjunction with the accompanying drawings.

DETAILED DESCRIPTION

A user interface (UI) of a device may be responsive to motion of the device as well as the position of the user relative to the device. When determining how to render a UI based on these different factors, a device may be capable of categorizing motions into discrete actions, called gestures. For example, a user may change a UI or execute other device functions by performing specific defined motions of the device, such as a rotation around and back about one axis of the device. The device may be configured to detect these particular specific gestures and to push a notification of the gesture to an application, operating system, UI or other layer that may execute a function in response to the gesture. For the present disclosure, an application may be the operating system of the device, a specific program running on the device, downloaded executable software and/or anything else running on the device. For example, the device may be configured to recognize and notify when a tilt gesture and/or a swivel gesture occurs and notify an application to perform a function, for example causing a menu user interface to appear on a display screen of the device.

To properly detect the gesture, the device may be configured with motion models, thresholds, and other data points described below to match against incoming motion data to detect and confirm a gesture. The models, thresholds, and other data points may be different depending on the device context, so that the device may properly detect gestures under varying conditions. The device context may include such things as the device's orientation, what hand the user is holding the device in, an application running on the device, whether the application is causing display of 2D or 3D graphics, a position of the user's head relative to the device, an identity of the user, and/or other considerations. Context may be divided into subcontexts, for example, motion based subcontexts (e.g., whether the device is being moved by a left or right hand), user based subcontexts (e.g., user identity), functionality based subcontexts (e.g., if an application running is 2D or 3D), etc. By configuring the device to determine a gesture based on the device's context or subcontext, the user experience may be improved.

Figure 1A:
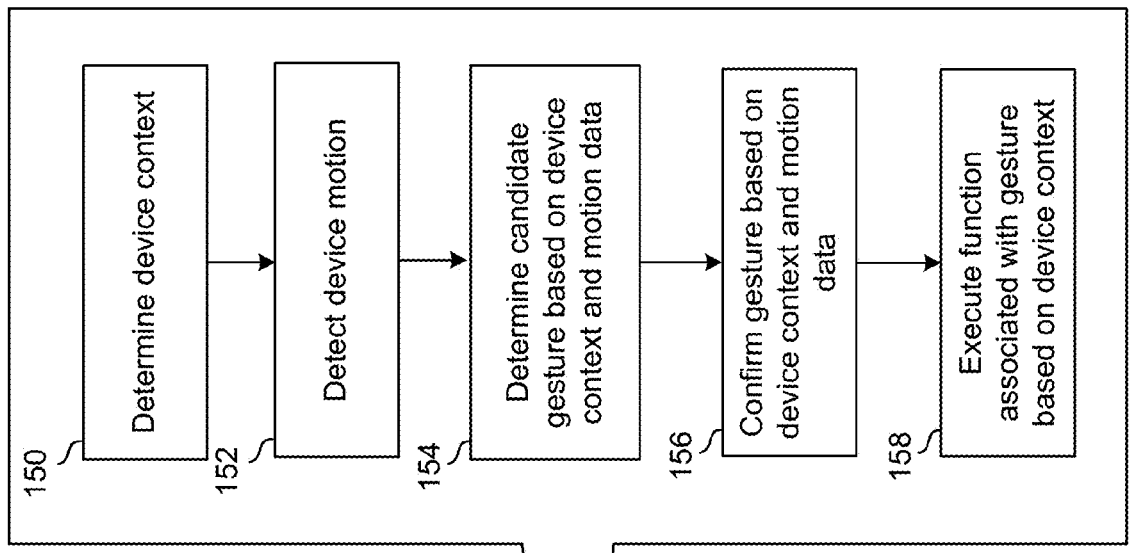
FIGS. 1A-1I illustrate an example approach for detecting and tracking a user in relation to a device in accordance with an embodiment.
Figure 1A:
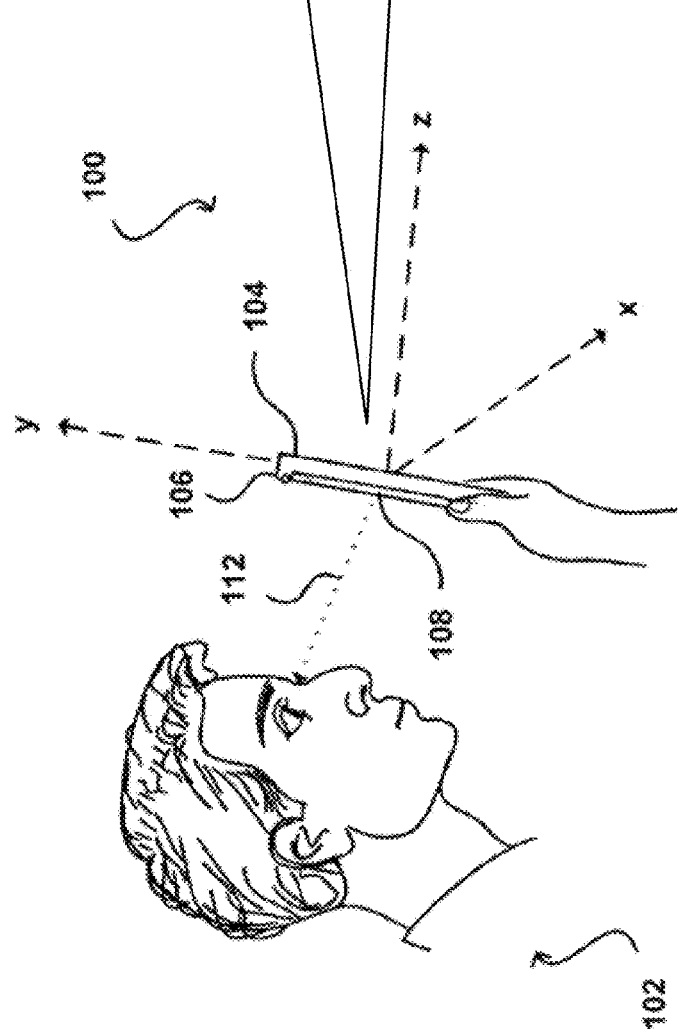

FIG. 1A shows a situation 100 of a user 102 viewing a screen 108 of a device 104. The device may be equipped with one or more cameras 106 that can detect the user's position relative to the device, illustrated by vector 112 (described further below). As shown, X, Y, and Z axes may be defined where the device can detect rotation of the device about one or more of the axes. The rotation may be the part of a gesture on the part of the user, where the user intends to activate a function of the device through moving the device 104 according to the gesture. The device 104 may determine the device context (150) and detect motion of the device (152). The device may determine a candidate gesture based on the device context and motion data (154). The device may then confirm the gesture based on the device context, motion data and/or other data (156). The device may then execute a function associated with the gesture based on the device context. For example, a gesture may call for execution of one function if a first application is running but call for execution of a different function if a second application is running. The device may execute the appropriate function for the gesture based on the context.

Various other functions and advantages are described and suggested below in accordance with the various embodiments.

Various embodiments involve determining a position of a user with respect to a device, such as by analyzing image data utilizing a user detection process, and tracking the user by combining the results of one or more tracking processes and/or other motion detection processes, such as determined by inertial sensors (e.g., accelerometer, gyroscope, inclinometer, and/or magnetometer). As there are not necessarily any dependencies between image-based tracking and inertial sensor-based motion detection, the two approaches can be complementary. The failure of one approach may not result in failure of the entire tracking system. For instance, image-based tracking can be computationally costly and may incur an undesirable amount of latency. Inertial sensor-based motion detection, on the other hand, has relatively lower latency but can be subject to drift over time. By combining image-based tracking and inertial sensor-based motion detection, the tracking system in the aggregate may not be subject to deficiencies of conventional approaches that use one particular approach alone.

In some embodiments, one detection and/or tracking process can be used as a primary or predominant approach and the other technique(s) may be used as the secondary detection and/or tracking approach(es) to the extent the primary or predominant approach fails to detect and/or track the user. For example, the secondary detection and/or tracking approach (es) may be executed only if the probability, confidence level, error rate, or other such metric corresponding to the estimated position of the user as determined by the primary detection and/or tracking approach is below a threshold value. As another example, one particular detection and/or tracking process may be highly accurate but computationally expensive and a second detection and/or tracking process may be less processor-intensive but less accurate from a "cold start" yet highly effective when the initial user position is known. The device can be configured to use the first detection and/or tracking process to detect the user and track the user using the second detection and/or tracking process thereafter.

In some embodiments, input data from inertial sensors or other input devices can be used to optimize an object tracking system. For example, device motion data captured by one or more inertial sensors can be used as a cue for where to begin detecting and/or tracking of the user in image data or to limit regions of the image data for detecting and/or tracking the user. As another example, a device may be equipped with an ambient light sensor that can capture the amount of ambient light in the environment in which the device is being used. Certain detection and/or tracking processes may be more sensitive to illumination conditions than others, and such processes may be selected (or not selected) for detecting and tracking a user and/or such processes can be weighted based on the determined amount of ambient light.

In some embodiments, multiple image-based user detection and/or tracking processes can be executed simultaneously, other motion determination techniques can be performed, and/or other sensor data analyzed for detecting and tracking a user. The data obtained by these independent processes can be aggregated for more robustly detecting and tracking a user. In various embodiments, sensor fusion techniques can be used to combine data from multiple sensors of a computing device. Sensor fusion can be used to aggregate data captured by multiple sensors or input devices, such as multiple cameras, inertial sensors, infrared transceivers, GPS, microphones, etc., to obtain information of a state of an object of interest that may be more accurate and/or complete than would be possible from a single sensor alone. For example, conventional cameras may be limited to capturing 2-D images of objects of interest. However, images captured by multiple cameras with different fields of view can be used to analyze the object of interest in three dimensions. As another example, a conventional three-axis accelerometer may be limited to measuring linear acceleration about three dimensions (e.g., x-, y-, and z-axis) while a three-axis gyroscope may be limited to measuring rotational acceleration about three dimensions (e.g., roll, pitch, and yaw). By implementing sensor fusion, the sensor data captured by the accelerometer and the gyroscope can be used to derive motion according to six dimensions or six degrees of freedom (6DOF). As yet another example, sensor fusion can be applied to aggregate motion and/or position of an object of interest evaluated using image analysis and motion and/or position derived from inertial sensor data.

In some embodiments, a probabilistic system can be created that models the physics of user motion, device motion, and image capturing by cameras of the device. The probabilistic system can define as inputs probability estimates of user position and/or orientation from the camera(s) of the device, probability estimates of device position and/or orientation from the inertial sensor(s) of the device, and/or other probability estimates. The probabilistic system can define the position and/or orientation of the user with respect to the computing device as the output based on a maximum likelihood estimation (MLE) approach. Sensor fusion techniques and probabilistic approaches can include Kalman filtering, extended Kalman filtering, unscented Kalman filtering, particle filtering, among others.

FIGS. 1A-1I illustrate an example approach of detecting and tracking a user in accordance with an embodiment. Returning to the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors, or other types of motion/orientation determination elements, such as accelerometers, gyroscopes, magnetometers, inclinometers, proximity sensors, distance sensors, depth sensors, range finders, ultrasonic transceivers, among others.

In this example, a vector 112 is shown from a point at the center of the display screen 108 to a point on the head of the user 102, such as between the user's eyes. Vector 112 is a three-dimensional vector that can be initially determined, for example, using a facial detection process performed on the image(s) captured by the camera 106. In other embodiments, the vector can be determined using sensors or other input devices of a computing system, such as inertial sensors or proximity sensors. In at least some embodiments, vector 112 can be used by the device to smoothly animate content displayed on the screen 108 to compensate for a change in perspective of the user with respect to the screen. In other embodiments, multiple vectors can be determined between the computing device and various features of the user, such as the user's eyebrows, eyes, irises, pupils, or mouth. In still other embodiments, other representations or models can be used to define the relationship between the user and the computing device, such as primitive geometric shapes (e.g., rectangle, ellipse, triangles, cylinders, ellipsoids), contours (e.g., edges comprising the boundaries of the user's head or face), silhouettes (e.g., regions within the contours of the user's head or face), etc.

Figure 1C:
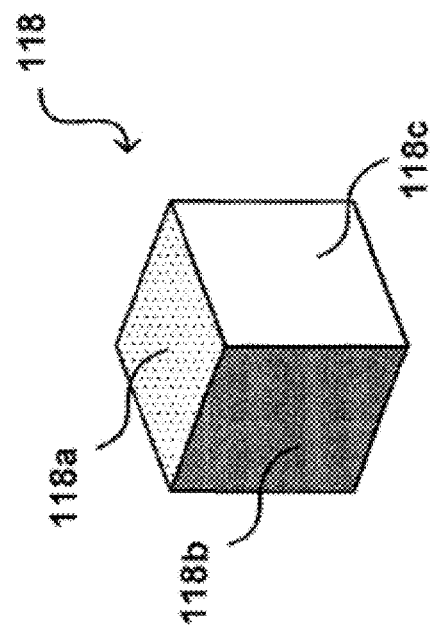
Figure 1B:
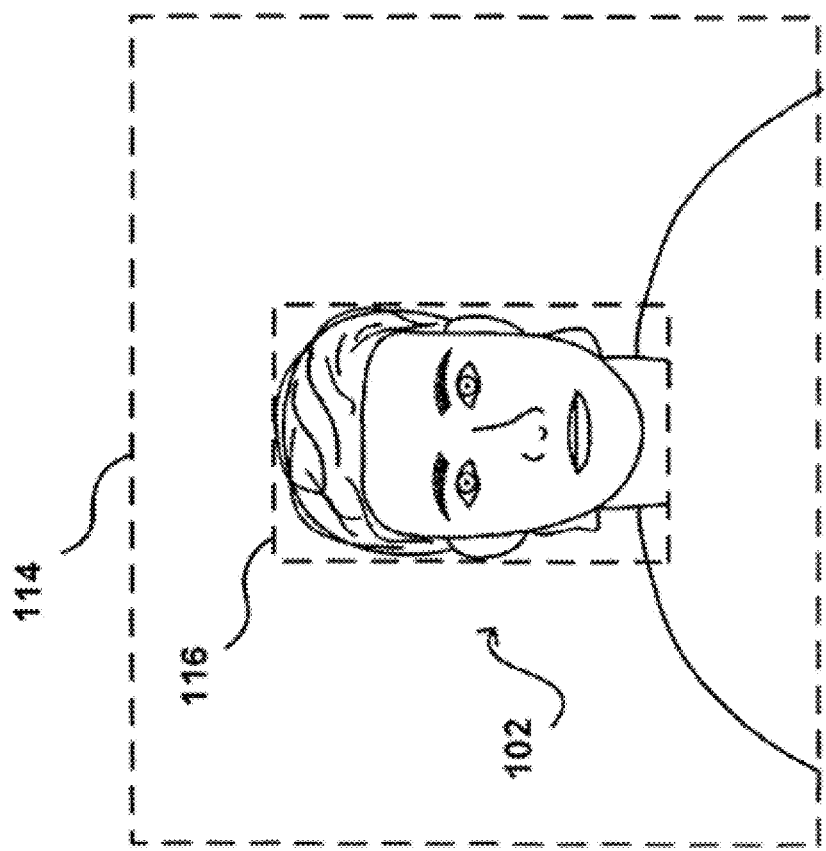

As illustrated in FIG. 1B, when the user 102 positions the computing device 104 directly in front of himself and gazes towards the display screen 108 straight on (i.e., the x-y plane of the device is parallel or substantially parallel to the user, where the lateral axis corresponds to the x-axis, the longitudinal axis corresponds to the y-axis, and the depth of the device or vertical axis corresponds to the z-axis), the image data captured by the camera 106 of the device can encompass the image 114. Although one image is shown to be captured in this instance, it will be appreciated that multiple images captured by a same camera at different times, multiple images captured by multiple cameras at a same time, or some combination thereof can be analyzed in various embodiments. Further, other embodiments may use other approaches, such as proximity sensors, to detect an object of interest with respect to a computing device. In this example, a user detection process is adapted for locating the head or face of a person. Here, the user detection process locates the head or face of the user 102 within the image 114 and provides as output the dimensions of a bounded box 116 indicating where the head or the face of the user is located in the image. In this example, the device is capable of rendering one or more three-dimensional graphical elements for display on the two-dimensional display screen 108 according to a first view or perspective of the user with respect to the display screen. The device relies on the pose of the head or face of the user with respect to the device and/or apparent motion of the user's head or face with respect to the device, as defined by vector 112, to render an appropriate perspective of a 3-D object as 2-D image data as illustrated in FIG. 1C, here, a cube 118 with a top surface 118a, a left front-facing surface 118b, and right front-facing surface 118c. The front-facing surfaces 118b and 118c appear to be equal in scale when the user gazes upon the display screen 108 straight on.

Figure 1D:
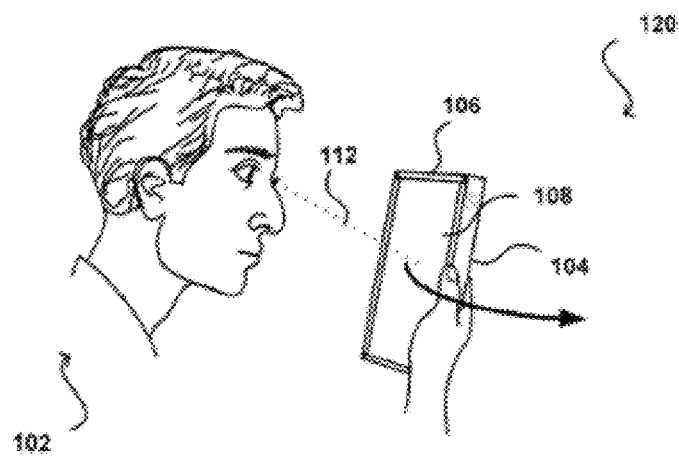
Figure 1E:
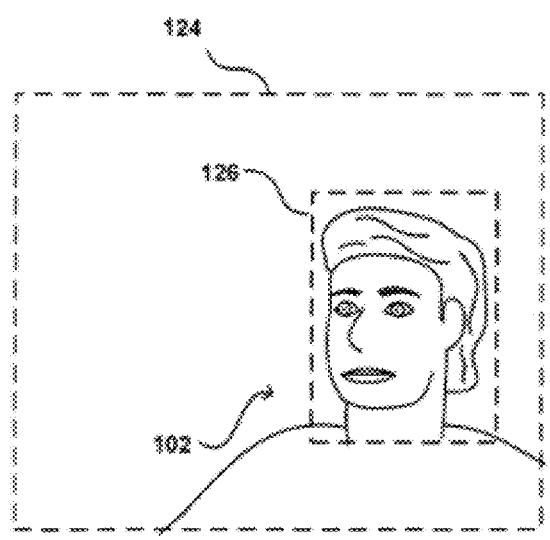
Figure 1F:
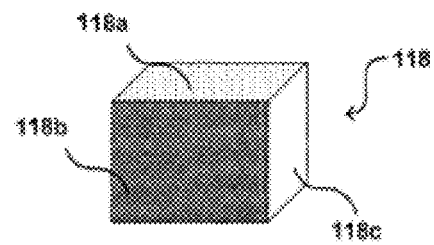
Figure 1G:
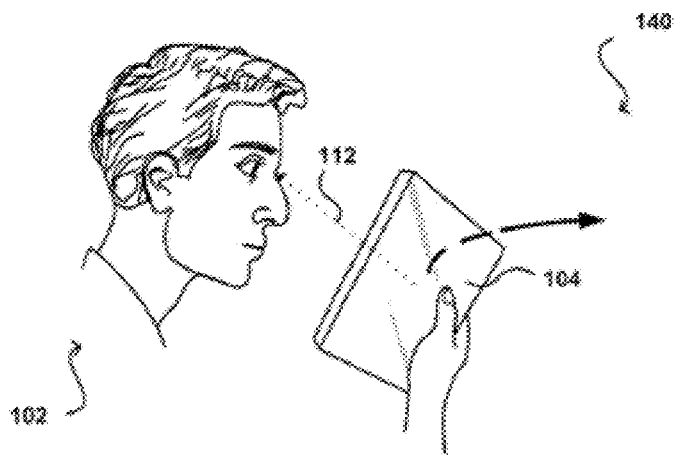
Figure 1H:
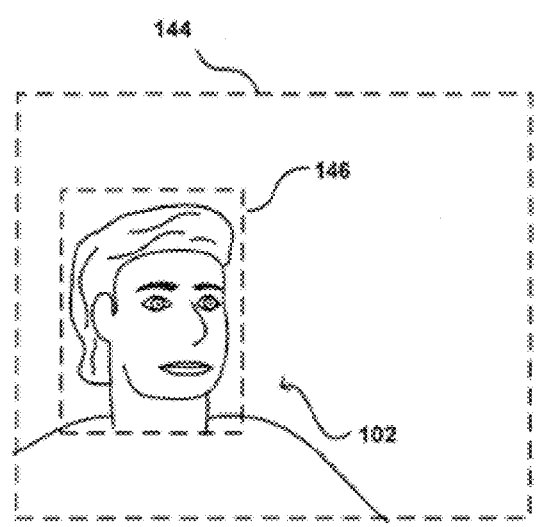
Figure 1I:
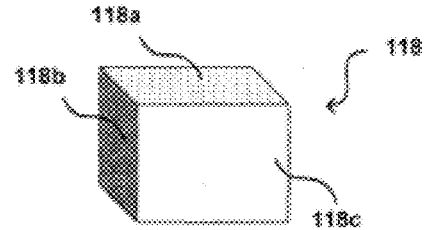

In FIG. 1D, an example situation 120 illustrates that the user 102 has tilted the computing device 104 to the right with respect to the perspective of the user, i.e., the user has rotated the device to his right about the longitudinal or y-axis, to obtain a second view or perspective of the 3-D object 118 depicted in FIG. 1F. As seen in FIG. 1E, the tilt or rotation of the device causes the camera 106 to capture a different view or perspective of the user within image 124, here, a three-quarters profile of the head or face of the user facing leftward. The position of the user's face may also be shifted towards a right region of the image because of the tilt or rotation of the device. In this example, the apparent motion of the face or head of the user (which is primarily due to the motion of the device) is tracked from the initial position detected in FIG. 1B to the new position depicted in FIG. 1E. For instance, the 3-D vector 112 between the point between the user's eyes and the center of the front face of the device is recalculated based on the new position and orientation of the user with respect to the computing device. Based on the apparent movement of the user's head or face, the 3-D object 118 is re-rendered for display on the display screen 108 to correspond to the new perspective of the user 102. For example, as the user tilts the device rightward, the device will render and/or animate the 3-D cube 118 such that the left front-facing surface 118b of the cube appears more prominently on the display screen and the right front-facing surface 118c appears at a more oblique angle.

In FIG. 1E, an example situation 140 illustrates that the user 102 has tilted the computing device 104 to the left with respect to the perspective of the user, i.e., the user has rotated the device to his left about the longitudinal or y-axis, to obtain a third view or perspective of the 3-D object 118. As seen in FIG. 1F, the tilt or rotation of the device causes the camera 106 to capture a three-quarters profile of the head or face of the user facing rightward, and the position of the user's face has also shifted towards a left region of the image. In this example, the apparent movement of the face or head of the user (which, again, is primarily due to the motion of the device) is tracked from a previous position to the new position depicted in FIG. 1F. The 3-D object 118 can be re-rendered for display on the display screen 108 based on the apparent motion of the user's head or face. For example, as the user tilts the device towards his left from the position depicted in FIG. 1B, the box will transition or be animated from the perspective seen in FIG. 1D to the perspective seen in FIG. 1B when the x-y plane of the device is parallel or substantially parallel to the user. As the user continues rotating the device towards his left, the 3-D cube 118 will transition or be animated from the perspective seen in FIG. 1B to the perspective seen in FIG. 1F wherein the right front-facing surface 118c of the cube 118 appears more prominently on the display screen and the left front-facing surface 118b appears at a more oblique angle. When the user tilts the device forward (i.e., rotating the device about the x-axis such that the top portion of front of the device is further away from the user and the bottom portion of the front of the device is closer to the user), details of a bottom surface (not shown) of 3-D cube 118 may be displayed and the top surface 118a may be hidden. Likewise, tiling the device backwards (i.e., rotating the device about the x-axis such that the top portion of the front of the device is closer to the user and the bottom portion of the front of the device is farther from the user), will cause the top surface 118a to be displayed more prominently. It will be appreciated that objects, such as the head or face of the user, can generally be tracked according to six degrees of freedom (e.g., motion along the x-, y-, and z-axes or forward/backward, up/down, and left/right, and rotation about the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the top surface 118a and left front-facing surface 118b of the cube may be displayed more prominently and the right front-facing surface 118c may be appear at a more oblique angle and the bottom surface may remain hidden. When the user tilts the device forward and towards his left (i.e., such that the bottom right corner of the device is the closest point of the device to the user), the bottom surface and right front-facing surface 118c can be displayed with more details, and the top surface 118a and left front-facing surface 118b may appear more obscured or hidden.

As mentioned, in some embodiments, tracking of the vector (or other representation of a user) can be based on analyzing the change in position and/or orientation of the user between a first image, such as image 114 of FIG. 1B, and a second image, such as image 124 of FIG. 1E. For example, one or more cameras of a device can be calibrated in order to recover 3-D quantitative measures about an object of interest represented in 2-D images captured by the camera(s), such as a distance of the object of interest from the device, the height of the object of interest, etc. Various approaches can be used for camera calibration, such as direct linear transformation (DLT); the algorithm set forth in Tsai, Roger, "A versatile camera calibration technique for high-accuracy 3D machine vision metrology using off-the-shelf TV cameras and lenses," Robotics and Automation, IEEE Journal of 3, no. 4 (1987): 323-344; and the algorithm set forth in Zhang, Zhengyou, "A flexible new technique for camera calibration," Pattern Analysis and Machine Intelligence, IEEE Transactions on 22, no. 11 (2000): 1330-1334, each of which are incorporated herein by reference.

In other embodiments, tracking of the vector can be based on input data captured using one or more sensors or other input devices of a computing system. For instance, a proximity sensor can be used to estimate an initial position of an object of interest with respect to the device. An accelerometer can measure the acceleration of a device and the change in the position of the device can be derived via double integration of the data obtained from the accelerometer. A gyroscope can measure the rate of change of the device's orientation (i.e., angular velocity) and the change in angular position of the device can be calculated by integration of the measured velocity. Fusion of the input data obtained by the accelerometer and gyroscope may provide updated dimensions of the vector between the user and the computing device.

In still other embodiments, a combination of image-based tracking and tracking by inertial sensors can be used to track an object of interest. As mentioned, image-based tracking and inertial sensor-based tracking can be complementary. For example, inertial sensors may not be capable of differentiating between a change in inclination of a device from acceleration of the device. Further, there may be greater uncertainty associated with measurements by inertial sensors at slow motion than at high velocities. That is, inertial sensors may be more accurate at very high velocities and accelerations but less accurate at lower velocities and accelerations. Cameras and other imaging elements, on the other hand, can track features of an object of interest accurately at low velocities. However, image-based tracking may be less accurate at higher velocities due to motion blur and the effect of camera sampling rate. In addition, for high velocities and accelerations, cameras with higher frame rates may be bandwidth-limited by real time tracking requirements. It may also be difficult to distinguish motion due to translation and motion due to translation for certain objects of interest. Further, a near object of interest with low relative speed can appear the same as an object of interest further away with high relative speed.

In addition to the complementary characteristics of inertial sensors and cameras, differences between inertial sensor-based track and image-based tracking may also exist in relation to the processing requirements of these tracking approaches. Inertial sensor-based tracking may be less computationally expensive than image-based tracking because position information can be derived in constant time from data captured by inertial sensors while image-based track requires processing of at least a portion of a captured image. Image-based tracking, however, can be more reliable than inertial sensors in determining a position of a user with respect to a device in certain instances. For example, if a device remains stationary but a user tilts his head, inertial sensors will indicate no change in position of the user with respect to the device. Image-based tracking, on the other hand, may be more likely to detect the motion of the user with respect to the device. As another example, a user may be operating a device in a moving vehicle. Inertial sensors may indicate that the device is moving according to the direction of the vehicle even though the user may remain stationary with respect to the device. Image-based tracking can be more reliable in determining the position of the user with respect to the device in such a scenario.

In various embodiments, aggregation of image-based tracking and inertial sensor-based tracking can be loosely coupled or tightly coupled. A loosely coupled approach can comprise independent imaging and inertial navigation systems, running at different rates, and exchanging information. Translational and angular velocity estimates from the inertial sensors can be used to predict device motion, and velocity estimates from image-based tracking can be used to bound integration errors in the inertial sensors. Prediction of device motion can make the feature correspondence process more robust and can reduce the search space, thus reducing processing and use of power. A tightly coupled approach combines raw data of the cameras and inertial sensors in a single, optimum filter, such as a Kalman filter or a particle filter, as discussed further elsewhere herein.

In certain situations, a user may remain stationary or a device will be moved such that movement of the user's face or head may be negligible relative to the motion of the device. In such situations, it may be preferable to use motion data detected by the inertial sensors of the device for tracking the position and orientation of the user after the user has initially been detected in image data. In some embodiments, a user's change in position can be determined primarily based on motion data detected by the device's inertial sensors. For example, in one embodiment, the motion data detected by the inertial sensors can be sampled at a rate of 100.0 ms to update the user's position with respect to the device, and image data can be sampled at a rate of every 5.0 s to ensure that the user's position as determined by the inertial sensors do not substantially drift from the user's actual position. An advantage of such an approach would be to reduce the amount of processing that may be required by image-based tracking and conserve the battery life of the computing device. In other cases, image-based tracking can be used as the predominant approach for tracking the position if the user with respect to the device, and motion detected by inertial sensors can be used as backup in the event image-based tracking fails. For instance, lighting may temporarily go out or the user may otherwise be temporarily occluded such that an image-based tracking process is unable to track the user. In such instances, motion data captured by inertial sensors can be used to extrapolate the position of the user until the tracking process is able to re-track the user or a user detection process is executed to reinitialize the user's position with respect to the device.

In various embodiments, input data from inertial sensors or other input devices can be used to improve a tracking system. In some embodiments, motion data captured by inertial sensors can be used to improve performance of image-based tracking. For example, the relative position and orientation of a computing device can be derived from the inertial sensor data when a user moves the computing device. Techniques for determining the position and orientation of a computing device from inertial sensor data is well known in the art and will not be discussed herein detail. The position and orientation obtained from the inertial sensors can be used to limit one or more regions of the image data to be analyzed by an image-based tracking process, which can optimize the image-based tracking process by circumscribing the image data needed to be searched by the image-based tracking process. Certain tracking processes track an object when a sufficiently good model of the object has been found, i.e., one with sufficiently small error. Computation time can be saved for such processes by initializing the tracking process to begin searching for the object at an expected position based on the inertial sensor data.

In some embodiments, an ambient light sensor can be used to improve performance a tracking system. For instance, certain image-based tracking processes may be more sensitive to changes in illumination than other tracking processes. When the amount of light determined by the ambient light sensor is determined to meet or exceed a threshold value, an illumination-sensitive tracking process can be selected as the primary tracking process and/or the illumination-sensitive tracking process can be weighted greater based on illumination conditions. Alternatively, when the amount of ambient light of the current environment is below a threshold value, illumination-sensitive tracking processes may be excluded as the primary tracking process or such processes can be weighted less.

Figure 2A:
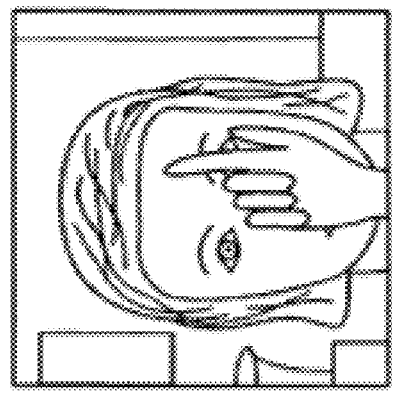
FIGS. 2A-2C illustrate stereoscopic image data that can be captured in accordance with various embodiments.
Figure 2B:
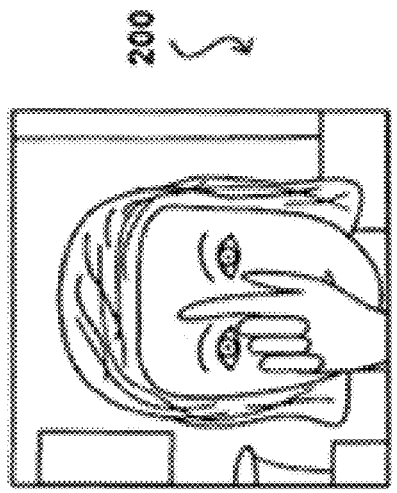
Figure 2C:
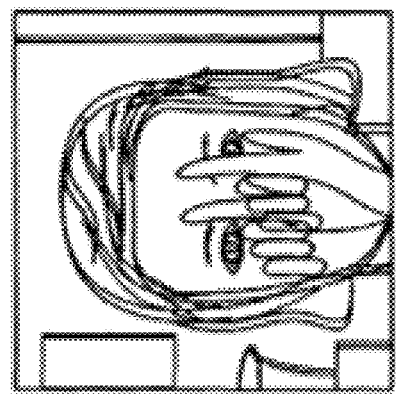

In some embodiments, a proximity sensor, depth sensor, distance sensor, structured lighting transceiver, and the like can be used to improve the robustness of a tracking system. For example, certain tracking processes capable of tracking an object in three-dimensional space can be more accurate with the distance or depth information provided by the proximity sensor, depth sensor, distance sensor, or structured lighting transceiver. In other embodiments, three-dimensional or stereoscopic image information can be captured using multiple cameras to provide three-dimensional point data, or disparity information that can be used to determine motion in three dimensions. FIGS. 2A and 2B illustrate images 200 and 220 that could be captured using a pair of cameras (e.g., stereoscopic cameras) embedded in a computing device. In various embodiments, the pair of cameras may capture the images simultaneously or substantially simultaneously and therefore would include at least some matching points of interest in their respective images. For example, the user's finger, nose, eyes, eyebrows, lips, or other features may be detected or tracked by the computing device in both images by using the various techniques discussed elsewhere herein. FIG. 2C illustrates an example combination image 240 showing the relative position of various objects in the captured images 200 and 220 if those images were "overlaid" or "superimposed" the amount of disparity, or lateral offset, between objects in the images. Objects closer to the device, such as the finger, have relatively large amounts of disparity. Objects farther away from the device, such as a painting on the wall, have relatively small amounts of disparity. Objects between these two areas will have intermediate amounts of disparity based upon the relative distance of those objects from the cameras.

Figure 3:
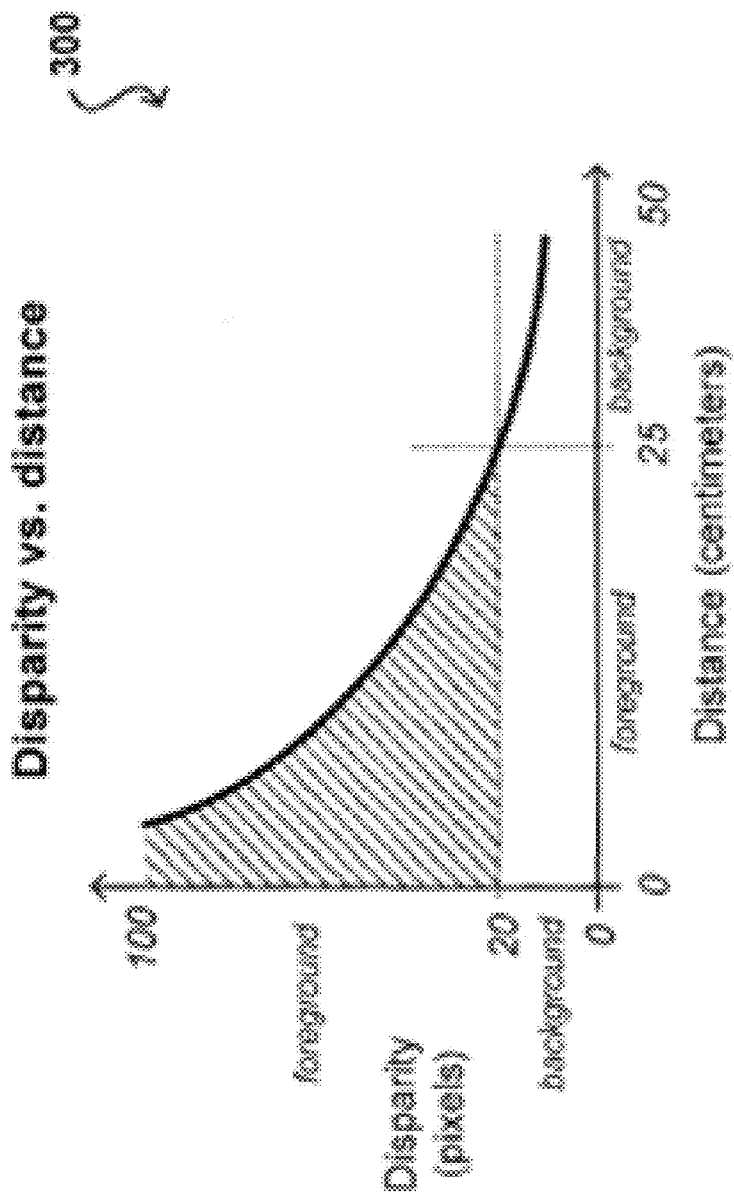
FIG. 3 illustrates an example plot showing a relationship of disparity with distance for an example stereoscopic imaging process that can be used in accordance with various embodiments.

FIG. 3 illustrates an example plot 300 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 300 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = \frac{fxB}{d}$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein.

In various embodiments, a user detection process is used to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and sub-sampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a predefined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by back-propagation with trained data. Such an approach is discussed in Huang, Gary B. et al. "Learning hierarchical representations for face verification with convolutional deep belief networks." In Computer Vision and Pattern Recognition (CVPR), 2012 IEEE Conference on, pp. 2518-2525. IEEE, 2012, which is incorporated herein by reference.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image} \mid \text{object})}{P(\text{image} \mid \text{non-object})} > \frac{P(\text{non-object})}{P(\text{object})}.$$

In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. The Viola-Jones detector is discussed in Viola, Paul et al. "Rapid object detection using a boosted cascade of simple features." In Computer Vision and Pattern Recognition, 2001. CVPR 2001. Proceedings of the 2001 IEEE Computer Society Conference on, vol. 1, pp. 1-511. IEEE, 2001, which is incorporated herein by reference.

Surveys of various approaches of user detection are discussed in Yang, Ming-Hsuan et al., "Detecting faces in images: A survey." Pattern Analysis and Machine Intelligence, IEEE Transactions on 24, no. 1 (2002): 34-58 and Hjelmås, Erik et al. "Face detection: A Survey." Computer Vision and Image Understanding 83, no. 3 (2001): 236-274, which are each incorporated herein by reference.

Figure 4A:
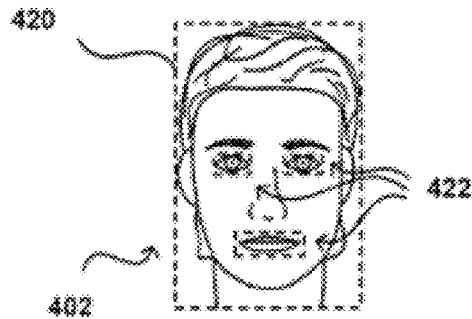
FIGS. 4A-4F illustrate examples of tracking a user in accordance various embodiments.

After at least a portion of a user has been detected in image data captured by a computing device, approaches in accordance with various embodiments track the detected portion of the user. FIGS. 4A-F illustrate certain approaches that can be utilized for detecting and tracking a user in accordance with various embodiments. FIG. 4A illustrates an example wherein the approximate position and orientation of the head of a user 402 has been determined and a virtual "box" 420 is placed around the user's head using one or more of the various user detection processes discussed herein. A similar or different approach can also be used to determine an approximate location and area 422 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device. Further, the relative movement of the user's eyes and mouth can be easier to detect than the overall movement of the user's face when the user is performing motions such as nodding or shaking the head back and forth.

Figure 4B:

Various other approaches can also be used to track the user. For example, FIG. 4B illustrates an example wherein various features on a user's face are identified and assigned a point 424 in the image. The system thus can detect various aspects of user facial features and can determine changes such as movement or change in shape or expression. Such an approach can provide advantages over the general approach of FIG. 4A in certain situations, as various points along a facial feature can be determined, such as the end points and at least one center point of a user's mouth. Accordingly, expressions such as a smile or frown can be captured even though the overall position of the user's mouth or face did not move.

Figure 4C:
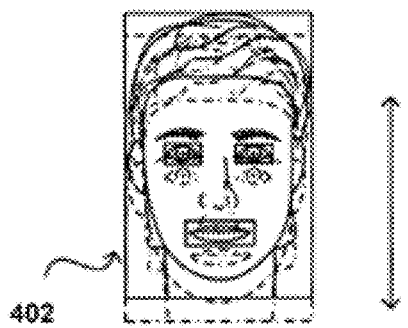
Figure 4D:
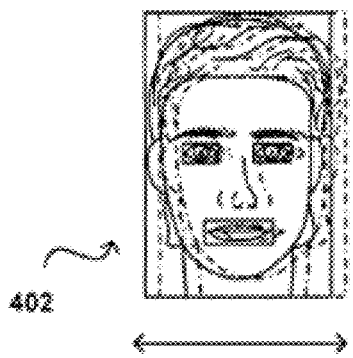
Figure 4E:
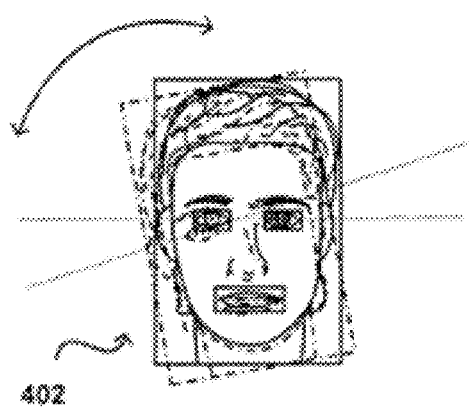

Once the facial features of a user are detected, relative motion or changes in facial expression can be tracked and utilized as input in accordance with various embodiments. For example, FIG. 4C illustrates an example where the user's head 402 is moving up and down with respect to the viewable area of the imaging element. As discussed, this could be the result of the user shaking his or her head, or the user moving the device up and down, etc. FIG. 4D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 4E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 4F:
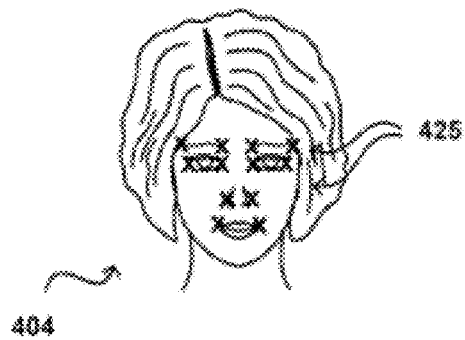

FIG. 4F illustrates another advantage of using an approach such as that described with respect to FIG. 4B to determine the position of various features on a user's face. In this example, it can be seen that the features of a head of a second user 403 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking.

In some embodiments, information from other sensors of the computing device, such as information about the motion of the computing device may be used to enhance the head/ face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's face is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's face (or other features) may become undetectable during certain time intervals due to lack of light. In this manner, the computing device may utilize information about the motion of the device and other context to assist the processes for user detection and tracking.

Figure 5A:
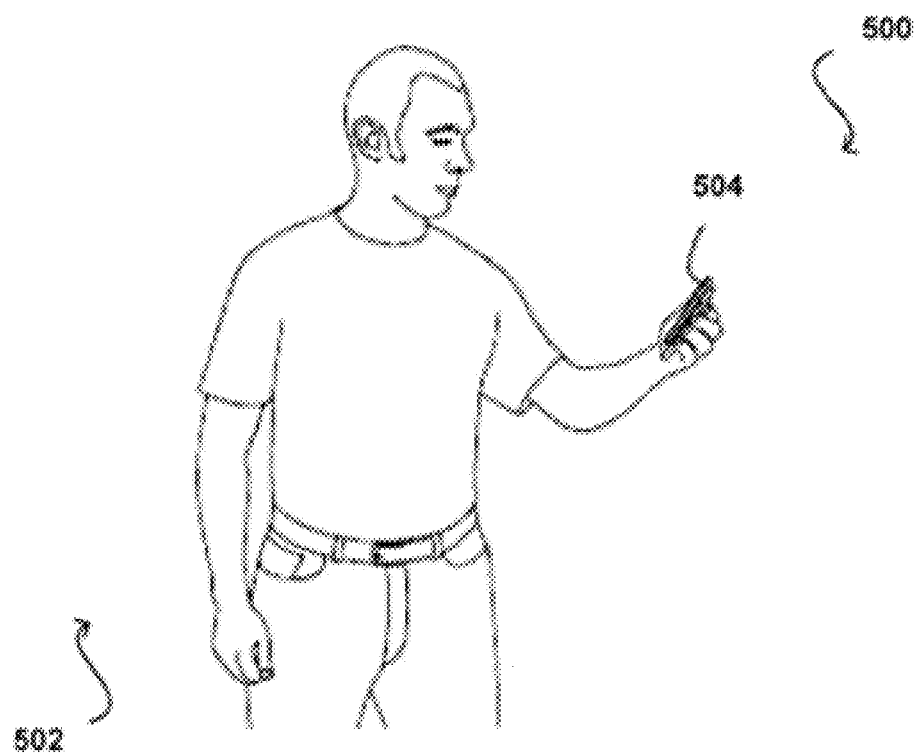
FIGS. 5A-5B illustrate example approaches for tracking a user in accordance with an embodiment.
Figure 5B:
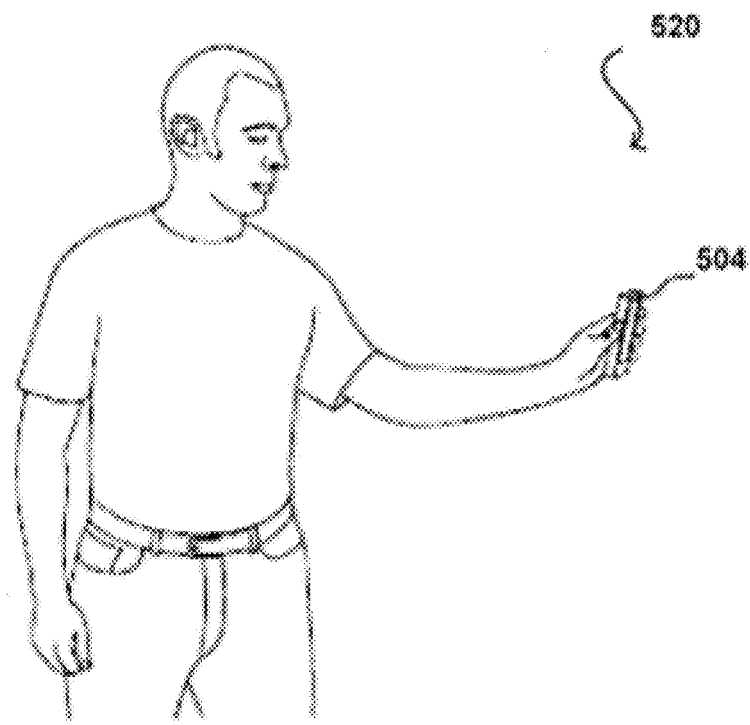

FIGS. 5A and 5B illustrate an example approach of using the motion of the computing device to supplement user detection and tracking in various embodiments. In FIG. 5A, the user 502 is holding a computing device 504, which in this example is shown to be a smartphone 504. The computing device may include one or more front-facing cameras that may capture images of the user's head, face, or other features and this image data may be analyzed for detecting and tracking a user as previously described. Because user detection and/or tracking typically can utilize a significant amount of resources, it may be useful for the computing device to leverage information about the motion of the device to enhance and supplement the user detection and/or tracking process. For example, it may be useful for the device to immediately detect (e.g., based on inertial sensor data) when the user has rotated or moved the device in such a way that the user would no longer be within the field of view of the front-facing camera(s). As shown in FIG. 5B, if the user turns the device around, the front-facing camera(s) would be facing away from the user and may have completely different objects within the field of view of the front-facing camera(s). One response to such detection may be for the computing device 504 to discontinue or suspend the user detection and/or tracking process rather than continue attempting to track the user. This may enable a more responsive user detection and/or tracking process.

Another example may be for the computing device to utilize the device motion information to continue the user detection and/or tracking process rather than discontinuing the process when the device is no longer detecting the user for short periods of time. For example, if the lighting conditions around the device are changing (e.g., when the user is on a moving train or bus), image data that can be analyzed may be captured when there is sufficient lighting and image data that cannot be analyzed may be captured when there is not enough lighting. Under such conditions, the device may analyze the motion information gathered by the sensors (e.g., accelerometer, gyroscope, light sensors, GPS receiver, etc.) and may determine that the computing device is likely located in a moving vehicle. Based on this determination, the computing device may elect to continue the user detection and/or tracking process uninterrupted (i.e., rather than repeatedly stopping and starting the process) based on the assumption that the user's face will soon once again become trackable due to the changing of the lighting conditions.

In some embodiments, user detection and tracking can be compensated, supplemented, or enhanced by motion estimation techniques that are based upon optical flow, such as block matching, differential methods, or phase correlation. Block matching is a correlation technique that searches for the best match between an image block of a current frame and a specified area of a previous frame. Differential techniques compute motion from spatial and temporal derivatives of image features such as intensities or filtered versions of the image. Differential methods include local methods and global methods. In various embodiments, local approaches based on the Lucas-Kanade optical flow algorithm can be used to determine inter-frame motion of an input video. The algorithm is set forth in Lucas, Bruce D. et al. "An iterative image registration technique with an application to stereo vision." In Proceedings of the 7th international joint conference on Artificial intelligence. 1981, and is incorporated herein by reference. The Lucas-Kanade algorithm estimates displacement of a neighborhood of pixels by analyzing changes in pixel intensity from the known intensity gradients of the image in that neighborhood. In other embodiments, a global approach, such as the Horn-Schunk algorithm or a variation thereof, can be used to determine inter-frame motion of an input video. The Horn-Schunk algorithm is set forth in Horn, Berthold K P et al. "Determining optical flow." Artificial intelligence 17, no. 1 (1981): 185-203, which is incorporated herein by reference. Horn-Schunk uses a global regularization calculation as an additional constraint.

In some embodiments, phase correlation is used to determine inter-frame motion of an input video. Phase correlation is a frequency domain technique based on the shift property of the Fourier transform for measuring motion. To determine inter-frame motion using phase correlation, the cross power spectrum (CPS) of two frames is determined. If one frame is a shifted replica of the other, i.e., f2(x,y)=f1(x+x0, y+y0) then the phase of the cross power spectrum of the two frames f1 and f2 can be defined as:

$$CPS(f_1, f_2) = \frac{F_1(\xi, \eta) \cdot F_2^*(\xi, \eta)}{|F_1(\xi, \eta) \cdot F_2^*(\xi, \eta)|} = e^{j2\pi(\xi x_0 + \eta y_0)}$$

where F is the Fourier transform of the frame f and F* is the complex conjugate. The inverse Fourier transform of the cross power spectrum is an impulse whose coordinates are located at (x0, y0), the required shift.

In various embodiments, a position and/or orientation of a user can be determined more robustly by combining results of an image-based user detection and/or tracking process with additional data, such as position estimates from one or more other image-based user detection and/or tracking processes or motion estimates from inertial sensors and/or other motion detection processes (e.g., optical flow). In at least some embodiments, a probabilistic system can be defined that models the physics of user motion, device motion, and imaging capturing by cameras of the device. The system can receive as inputs position/orientation estimates from one or more image-based detection and/or tracking processes, device motion estimates from inertial sensors or optical flow techniques, other input data, and confidence levels associated with each of these inputs. The system can be modeled to output the position and/or orientation of the user using a maximum likelihood estimation (MLE) approach. Likelihood is closely related to the more familiar concept of probability. For example, the probability p of an event x, dependent upon model parameters θ, is defined as:

$$p(x|\theta).$$

The likelihood function l for θ, on the other hand, is defined as:

$$l(\theta|x) \equiv p(x|\theta)$$

That is, the likelihood l characterizes the parameters θ of the model given the observed data x. Maximum likelihood estimation aims to find the parameter(s) θ that make the observed data x most likely. MLE approaches can include Kalman filtering or variations thereof (e.g., extended Kalman filter, unscented Kalman filter), particle filtering, among others.

In Kalman filtering, the state of a linear system can be estimated based on a Gaussian distribution of the state. Kalman filtering comprises two steps—prediction and correction. The prediction step uses the state model to predict the new state of the parameters of the model:

$$\overline{X}^t = \vec{D}X^{t-1} + W,$$

$$\overline{\Sigma}^t = \vec{D}\Sigma^{t-1}\vec{D}^T + Q^t,$$

where $\overline{X}^t$ is the state prediction at time t, $\overline{\Sigma}^t$ is the covariance prediction at time t, $\vec{D}$ is the state transition matrix correlating the relationship between the state parameters at time t and t−1, Q is covariance of the noise W. In the correction step, the current measurement Zt is used to update the object's state:

$$K^t = \overline{\Sigma}^t \vec{M}^T [\vec{M}\overline{\Sigma}^t \vec{M}^T + R^t]^{-1},$$

$$X^t = \overline{X}^t + K^t \underbrace{\left[ R^t - \overline{M} \overline{X}^t \right]}_{v},$$

$$\Sigma^t = \overline{\Sigma}^t - K^t \vec{M}\overline{\Sigma}^t,$$

where v is referred to as the innovation, $\vec{M}$ is the measurement matrix, K is the Kalman gain (also referred to as the Riccati equation) used for propagation of the state model. When the system is nonlinear, a Taylor series expansion can be used to extend the Kalman filter.

When using a Kalman filter for tracking a user, the state of the Kalman filter may represent, for example, one or more of a position of the user relative to the device, a velocity or acceleration of the user with respect to the device, a position of the device, and motion of the device. The measurements used by the Kalman filter may include, for example, a location of the user as determined from camera images and measurements from inertial or other sensors of the device. For each new set of measurements obtained by the device the Kalman filter may be updated to obtain a new estimate of the location of the user relative to the device.

In particle filtering, the state of the object is modeled as a sampling probability instead of as a Gaussian distribution. Particle filtering models the conditional state density P(Xt|Zt) at time t as a set of samples or particles $\{s_t^n : n=1, \ldots, N\}$ with sampling probability or weights $\pi_t^n$. The weights are used to characterize the importance of a particular sample or particle. A common sampling technique is importance sampling, which includes selection of N random samples $\hat{s}_t^n$ from $\vec{S}_{t-1}$ by generating a random number r between 0 and 1 and finding the smallest j such that $c_{t-1}^{j-1} > r$ and setting $\hat{s}_t^n = \hat{s}_{t-1}^j$. In the prediction step, for each selected $\hat{s}_t^n$, a new sample is generated by:

$$s_t^n = f(\hat{s}_t^n, \vec{W}_t^n),$$

where $\vec{W}_t^n$ is a zero mean Gaussian error and f is a non-negative function, i.e., f(s)=s. In the correction step, weights $\pi_t^n$ corresponding to the new samples $s_t^n$ are calculated using the measurements zt by:

$$\pi_t^n = p(z_t|x_t = s_t^n),$$

where p can be modeled as a Gaussian density. Using the new samples $\vec{S}_t$, the new position of the object can be estimated using:

$$\epsilon_t = \Sigma_{n=1}^{N} \pi_t^n f(s_t^n, \vec{W}).$$

When using a particle filter for tracking a user, the states and measurements may be the same as when using a Kalman filter. For each new set of measurements obtained at the device the particle filter may be used, as described above, to obtain a new estimate of the location of the user relative to the device.

Figure 6A:
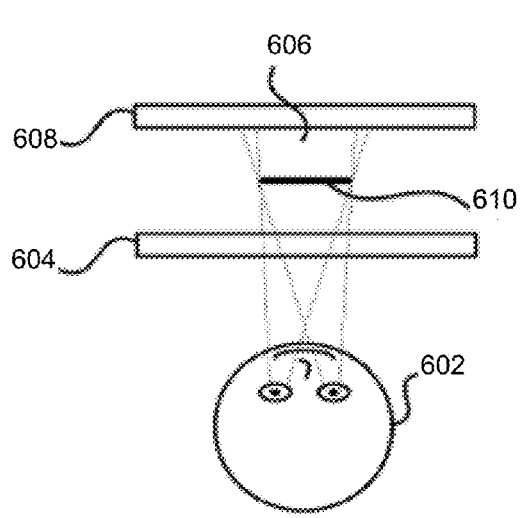
FIGS. 6A-6D illustrate example approaches to determining changes in the relative viewing angle for a user in accordance with various embodiments.
Figure 6B:
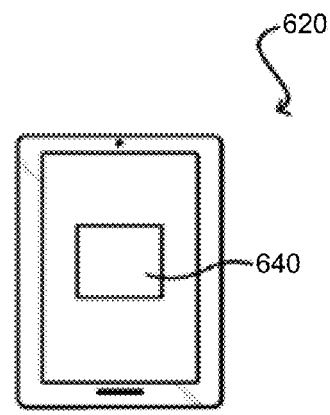
Figure 6C:
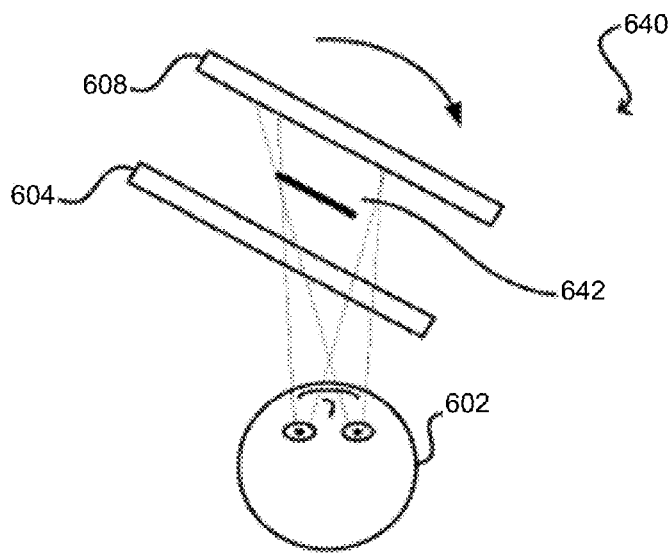
Figure 6D:
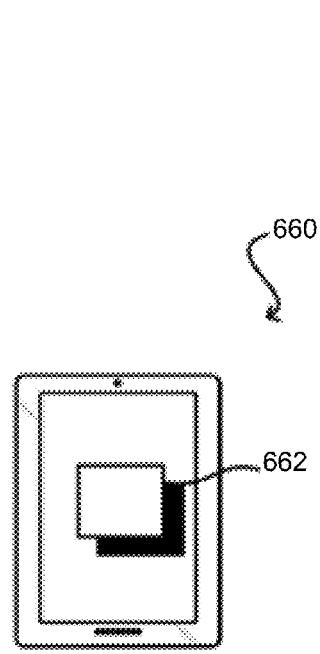

FIGS. 6A to 6D illustrate an example of how an interface plane or element at different depths can be used to generate viewing-angle appropriate images in accordance with at least some embodiments. In FIG. 6A, the example orientation 600 has a user 602 substantially in front of a display element 604 of a device. For simplicity of explanation, the interface plane or element here is represented in three dimensions, with a box 606 on a background 608. At the current viewing angle, the user is only able to see the top surface 610 of the interface plane or element 606, as illustrated in the display view 620 of FIG. 6B. In the orientation 640 of FIG. 6C, the device has been rotated (or the user has moved with respect to the device). To provide an appropriate user experience in at least some embodiments, the interface plane or element is effectively rotated with the device, such that the interface plane or element and background 608 would rotate accordingly. Based on the current viewing direction of the user 602, it can be seen in the display view 660 of FIG. 6D that the viewable portion 662 of the interface plane or element includes not only the top of the interface plane or element but at a level of depth (i.e., the interface plane appears to be closer to a display screen of the device). By calculating this angle, the application can determine the portions of the top and side of the interface plane or element to display as a result of the rotation. It also can be seen in FIG. 6C that any area occluded by the right side of the interface plane or element in FIG. 6A now can be seen, and that the area occluded by the left side of the box is interface plane or element greater in FIG. 6C.

Figure 7A:
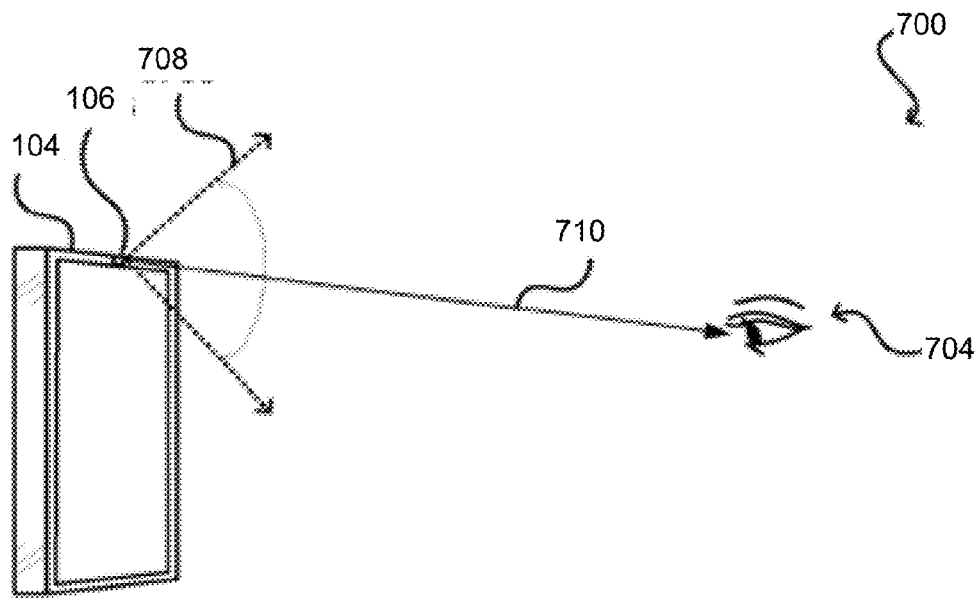
FIGS. 7A-7B illustrate an example approach to determining the relative position of a user that can be utilized in accordance with various embodiments.

In at least some embodiments, a computing device can utilize one or more cameras or other such sensors to determine the relative direction of the user. For example, FIG. 7A illustrates an example situation 700 wherein a computing device 104 is configured to utilize at least one camera element 106 to attempt to locate a feature of a user, such as the user's head or eyes, for purposes of point of view determination. In this example, the user's eyes 704 are located within the field of view 708 of a camera of the computing device 104. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 710 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 7B:
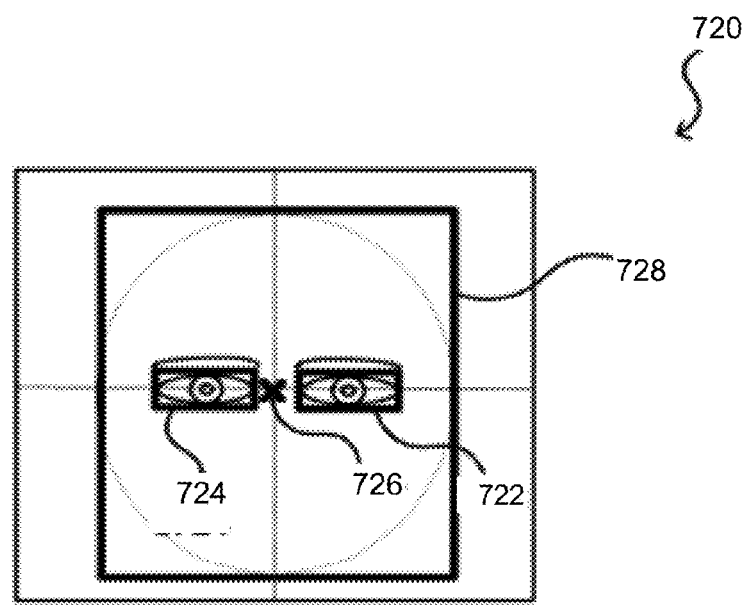

Further illustrating such an example approach, FIG. 7B illustrates an example image 720 that could be captured of the user's head and eyes using the camera 106 of FIG. 7A. One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 722, 724 for each eye, or at least an approximate location 728 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 726 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element (or combination thereof) of a computing device can be used to determine motion and/or orientation of the computing device, which can help adjust point of view determinations. The sensors may be any appropriate motion sensor(s) capable of providing information about rotations and/or translations of the device, as may include accelerometers, inertial sensors, electronic gyroscopes, electronic compasses, magnetometers, and the like. The device can be configured to monitor for a change in position and/or orientation of the device using these motion sensor(s).

Upon detecting a change in position and/orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone.

Figure 8:
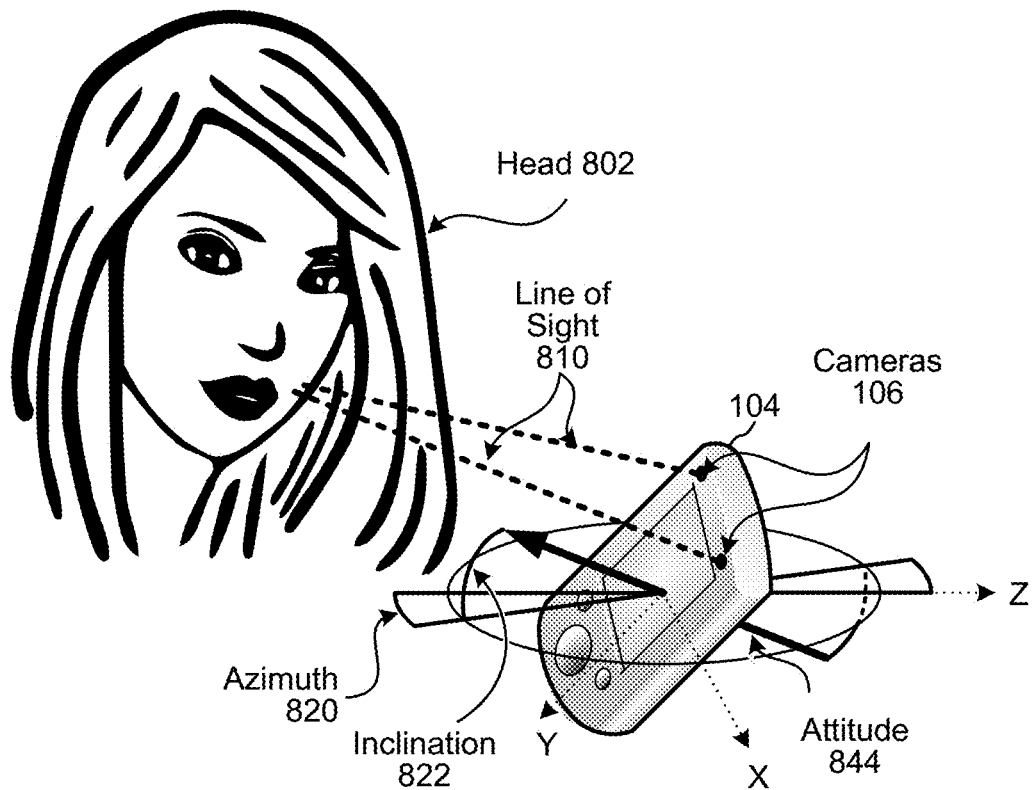
FIG. 8 illustrates using motion sensors with image processing to compute motion of a device in accordance with various embodiments.

FIG. 8 illustrates the use of the camera(s) 106 to determine orientation of the device 104 relative to a face/head 802 of a user while motion sensors may detect orientation/motion of the device 104. The position of the user/head may be determined based on the distance from the user to the device as well as based on the angle of the user/head relative to the device using camera(s) 106 and line of sight 810 using techniques described above. The device 104 may then render the UI based on the position of the user's face/head, for example using a projection matrix to render UI features as if the user's head is a camera projecting the UI. When a position of the user's head is established, certain changes to the head position may be detected using the motion sensors of the device, which provide output with lower latency that that of a head tracking system described above. The motion sensors of the device 104 may be used to track changes in device motion relative to an XYZ coordinate system (such as that illustrated in FIG. 8), relative to an angular position, such as an orientation measured in azimuth 820, inclination 822, or attitude, 824, or relative to some other measurement system. With a priori knowledge of the head position (as calculated by a camera based head tracking system) before a specific device motion, the device 104 may measure a change in orientation/position as measured by motion sensor(s) to compute an expected post-motion head position. The UI may then be rendered based on this expected post-motion head position.

Figure 9A:
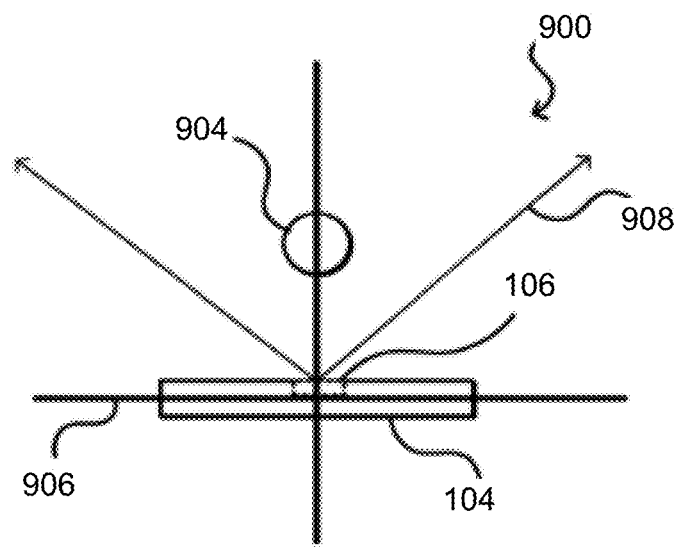
FIGS. 9A-9B illustrate an example approach to determining device motion that can be utilized in accordance with various embodiments.

For example, FIG. 9A illustrates a "top view" 900 of a computing device 104 operable to capture an image of an object 904 (e.g., a user's head) within an angular view 908 of a camera 106 of the computing device. In this example, the computing device 104 includes at least one orientation- or rotation-determining element, such as an electronic compass or electronic gyroscope, that is able to determine a frame of reference 906 in two or three dimensions with respect to a first orientation of the device. In at least some embodiments, an electronic compass might be used to determine an axis of the frame of reference 906, as may correspond to a North direction, etc. In other embodiments, a component such as an electronic gyroscope might be calibrated periodically with a component such as a compass, but might instead determine changes in orientation about three axes of rotation over time. Various other approaches to determining changes in orientation about one, two, or three axes of rotation can be used as well within the scope of the various embodiments.

A first frame of reference 906 or orientation can be determined at or near the time of capture of a first image by a camera 106 of the computing device 104. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 9B:
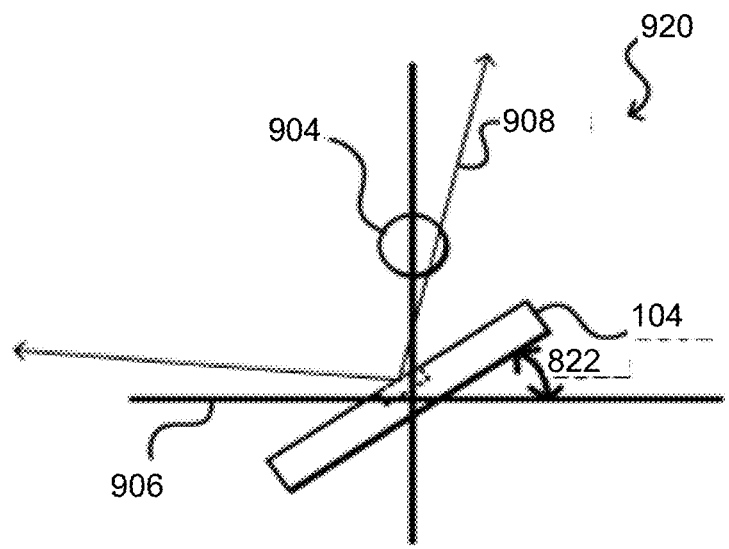

FIG. 9B illustrates a second top view 920 after a change in orientation of the computing device 104. The electronic gyroscope (or other such component or embedded sensor) can detect the change in orientation, in this example corresponding to a change in angle 912 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 912 about a single axis. As illustrated, this causes the object 904 to be moved to the right edge of the field of view 908 of the camera 106. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

When a device is configured with user interfaces (UI) that depends on the motion of the device, the typical configuration is that the device detects motion using motion sensors and then sends the motion data to a UI control component so the UI can adjust its display based directly on the motion (for example, moving a cursor about a display, interacting with a motion based video game, etc.). In certain situations, however, it is desirable to interpose an intermediate layer between the motion sensors and the UI that can take the motion data and categorize the determined motion into one or more categories of specific motions, called gestures. Those gestures may be specific motions of the device caused by the user that are intended to activate a particular function. The particular function may vary depending on what is running on the device at the time, such as a particular application, the home screen, etc. Or a gesture may have a single function across a device's operation.

Certain devices may execute functions based on motions, where the function varies across different applications. As an example, an Apple iPhone may recognize a "shake" motion where a user shaking a device can cause one application (such as email) to execute an undo function and another application (such as Google Maps) to execute a feedback function. These devices, however, fall short of interpreting motions as gestures, as these motions do not account for direction or orientation of the device or the motion. Further, these devices also do not account for device context, or user history when interpreting the device motion or classifying device motion as a particular gesture. As a result, current devices may attempt to trigger a function even when the motion in question happens at a time where the motion should not result in a particular function (such as shaking a device while in a user's pocket).

As an example of particular gestures, reference is made here to tilt and swivel gestures. A "tilt gesture" is a motion of a device concentrated about a single axis of the device where the device rotates in one direction around the axis and then returns to center. A "swivel gesture" is a motion of a device concentrated about the device's Z axis where the device rotates in one direction around the Z axis and returns to center. As a device is normally held in a portrait or landscape orientation, motion about the X or Y axes may present as the user actually tilting the device, whereas motion about the Z axis may present as the user turning the device on a swivel, hence the name difference. Functionally, swiveling is similar to tilting, and shall be discussed below as the same, save for the difference in axis around which the device rotates and the accompanying changes in motion data.

Figure 10A:
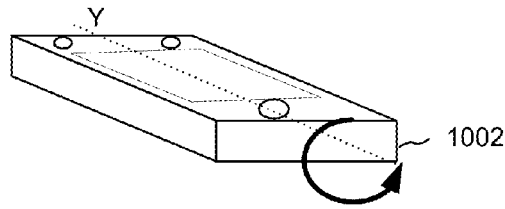
FIGS. 10A-10D illustrate a device undergoing motion corresponding to different tilt gestures in accordance with various embodiments.
Figure 10B:
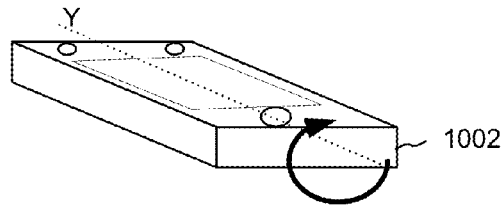

FIGS. 10A-10F illustrate tilt and swivel motions of a device to trigger tilt and swivel gestures. FIG. 10A illustrates a counterclockwise tilt to execute a tilt gesture about the Y axis of a device. FIG. 10B illustrates a clockwise tilt to execute a tilt gesture about the Y axis of a device. If a device is being held in landscape orientation, FIGS. 10A and 10B would represent tilting the top of the device forward or back (depending on which side of the device is up. If a device is being held in portrait orientation, FIGS. 10A and 10B would represent tilting the left or right side of the device forward. If the user is holding the device in portrait orientation in his/her left hand with side 1002 toward the ground, the user may tilt the device to execute the tilt gesture of FIG. 10A by flicking his/her fingers toward his/her body (in a movement called wrist supination). If the user is holding the device in portrait orientation in his/her right hand with side 1002 toward the ground, the user may tilt the device to execute the tilt gesture of FIG. 10A by flicking his/her fingers away from his/her body (in a movement called wrist pronation). Similarly, if the user is holding the device in portrait orientation in his/her right hand with side 1002 toward the ground, the user may tilt the device to execute the tilt gesture of FIG. 10B by flicking his/her fingers toward his/her body (supination). If the user is holding the device in portrait orientation in his/her left hand with side 1002 toward the ground, the user may tilt the device to execute the tilt gesture of FIG. 10B by flicking his/her fingers toward his/her body (pronation).

Figure 10C:
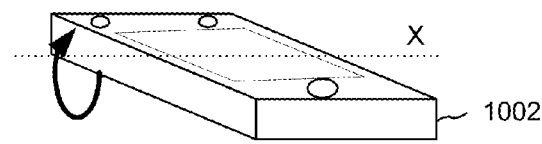
Figure 10D:
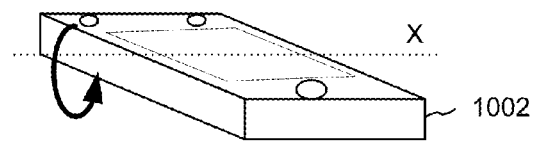

FIG. 10C illustrates a counterclockwise tilt gesture about the X axis of a device. FIG. 10D illustrates a clockwise tilt to execute a tilt gesture about the X axis of a device. If the device is being held in portrait orientation with side 1002 toward the ground the user may tilt the device to execute the tilt gesture of FIG. 10C by tilting the top of the device toward his/her body and may tilt the device to execute the tilt gesture of FIG. 10C by tilting the top of the device away from his/her body. If the device is being held in landscape orientation using two hands with the screen facing the user and side 1002 in the user's right hand, the user may tilt the device to execute the tilt gesture of FIG. 10C by pulling the left side of the device toward his/her body and may tilt the device to execute the tilt gesture of FIG. 10D by pulling the right side of the device toward his/her body.

Figure 10E:
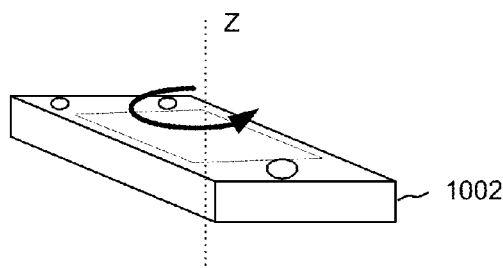
FIGS. 10E-10F illustrate a device undergoing motion corresponding to different swivel gestures in accordance with various embodiments.
Figure 10F:
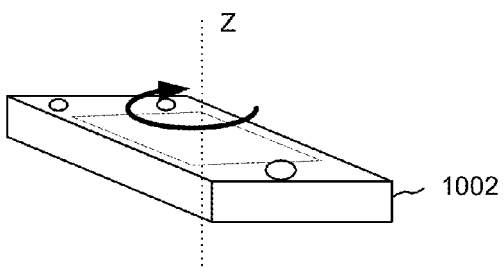

FIG. 10E illustrates a counterclockwise swivel/tilt to execute a swivel/tilt gesture about the X axis of a device. FIG. 10F illustrates a clockwise swivel/tilt to execute a swivel/tilt gesture about the X axis of a device. These tilt gestures may be executed in various ways by turning the device as illustrated.

The focus of the tilt gestures illustrated in FIGS. 10A-10F is that for each gesture, the motion of the device is focused around a single axis. While moving a device perfectly about one axis is difficult, if the majority of motion detected is around a single axis, the device may determine that the user intended to activate a tilt gesture and activate that tilt gesture. This process is explained further below.

Offered is a method and system to detect device motions, interpret those motions in relation to a device context and/or user history, and to select a tilt gesture as corresponding to those motions when the motions match expected motions of a tilt gesture. The selected gesture, about with other data, may be sent to a higher layer, such as an application or operating system, for execution of a function associated with the gesture.

A gesture service may be configured that sits as an intermediate layer between lower layer motion sensors and higher layer functions, such as applications, OS, etc. The gesture service may monitor motion data to determine if the motion data matches a model for a gesture, such as a tilt gesture. The gesture service may then notify an application, OS, etc. when a gesture is detected. The app, OS, etc. may then activate the function corresponding to the detected gesture. Thus the gesture service may be used to determine when certain discrete actions are intended by a user and should be taken based on specific motions of the device, rather than simply having raw motion data be used as the only method of controlling a device through motion.

Figure 11:
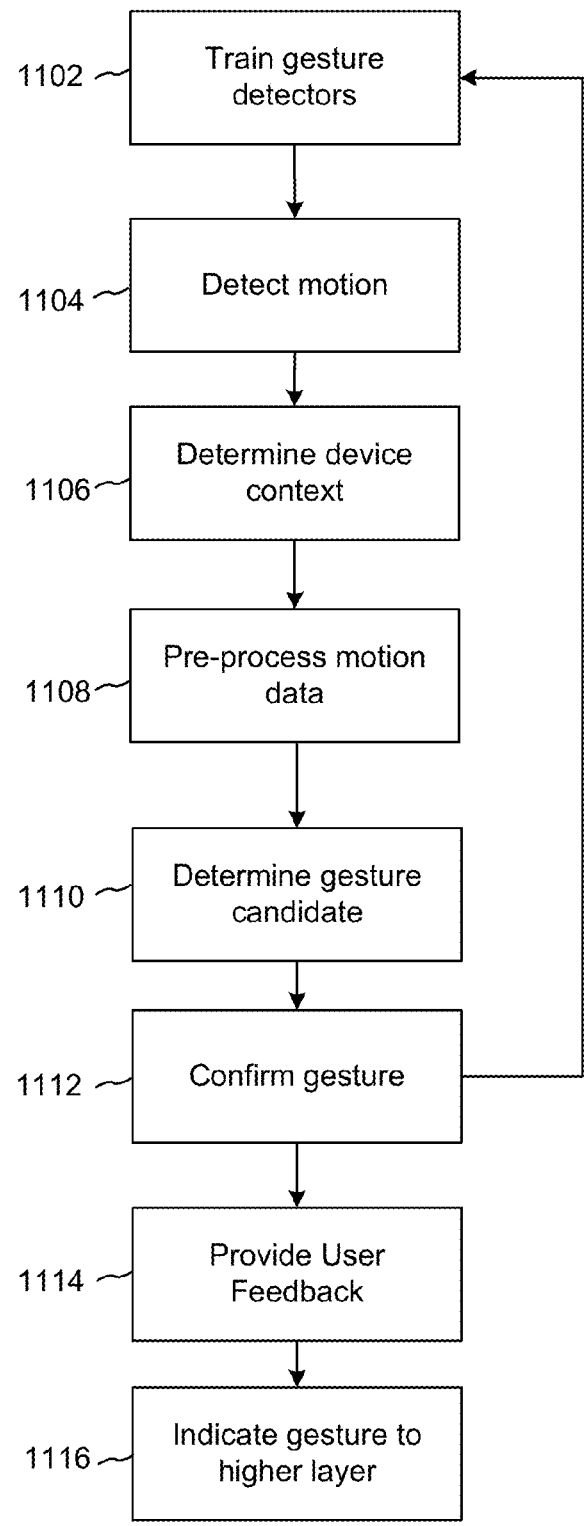
FIG. 11 is an example of a method for implementing an algorithm for detecting a gesture in accordance with various embodiments.

As shown in FIG. 11, a system may train gesture detectors (1102) based on user behavior, device context, or other factors discussed below. During runtime, the system may detect motion of the device (1104). The system will then determine the device context (1106) which may include what applications are running on the device, how the device is being held, what user is operating the device, etc. The system may then pre-process the motion data (1108) and determine whether (1110) the motion matches the motion expected for a particular gesture in the particular context. The system may pre-process the motion data (1108) substantially in parallel with determining the device context (1106). The system may then confirm the gesture (1112) based on a second check of various data features as explained below. After gesture confirmation (or at a different time), the system may feedback certain data to a training module to update the models or other information used by gesture candidate detector and/or gesture candidate confirmation module. This feedback may enable dynamic training of the gesture detection system. During or after the device motion, the system may provide user feedback (1114) to indicate that the gesture is in progress or was detected. After the gesture is detected the system may indicate the gesture (1116) to one or more higher layers (application, OS, etc.) along with potential other data describing the gesture (such as a force of the gesture, timing of the gesture, etc.). These processes are described in more detail below.

Figure 12:
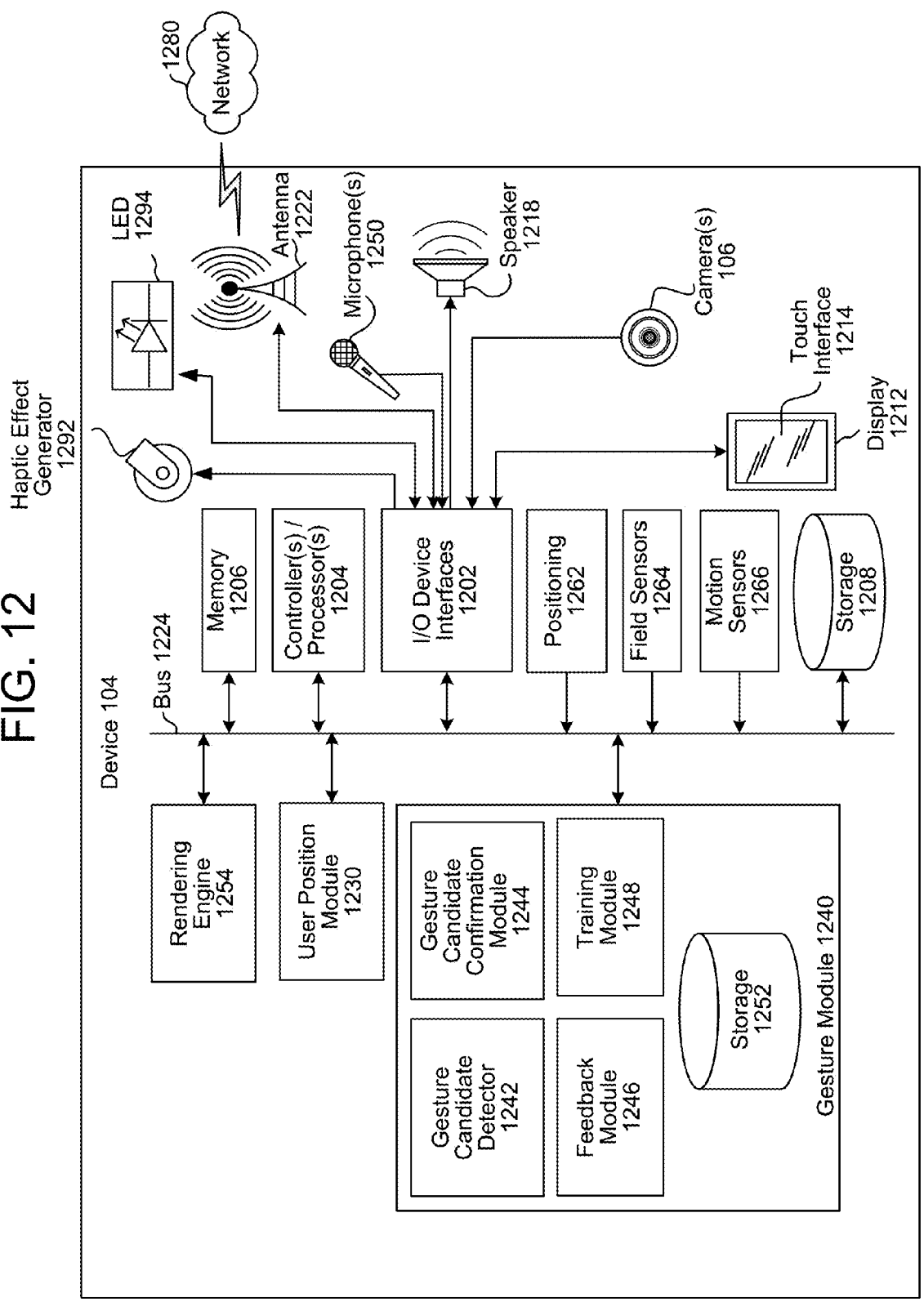
FIG. 12 is an example block diagram conceptually illustrating example components of a device in accordance with various embodiments.

FIG. 12 illustrates a block diagram conceptually illustrating components of a system to perform the steps described herein. Depending upon how the system is structured, some of components shown in FIG. 12 as part of a device 104 may be included in one or more other devices. In operation, the system may include computer-readable and computer-executable instructions that reside in storage 1208 on the device 104. The device 104 may be a mobile device, such as a smart phone, tablet, smart watch, or the like.

The device 104 may include one or more controllers/processors 1204 comprising one-or-more central processing units (CPUs) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 104 may also include a data storage component 1208 for storing data and processor-executable instructions. The data storage component 1208 may include one or more non-volatile storage types such as magnetic storage, optical storage, solid-state storage, etc. The device 104 may also be connected to a removable or external non-volatile memory and/or storage (such as a removable memory card, memory key drive, networked storage, etc.) through the input/output device interfaces 1202.

Executable instructions for operating the device 104 and its various components may be executed by the controller(s)/processor(s) 1204, using the memory 1206 as temporary "working" storage at runtime. The executable instructions may be stored in a non-transitory manner in non-volatile memory 1206, storage 1208, or an external device. Alternatively, some or all of the executable instructions may be embedded in hardware or firmware in addition to or instead of software.

As shown in FIG. 12, the device 104 may include one or more of a variety of sensors. Among the sensors are an audio capture component such as microphone(s) 1250, an image and/or video capture component such as camera(s) 106, a touch interface 1214, an antenna 1222, positioning sensors 1262, field sensors 1264 (e.g., a 3-axis magnetometer, a gravity sensor), and motion sensors 1266 (e.g., a 3-axis accelerometer, a 3-axis gyroscope). The device 104 may also include one or more buttons (not shown). Several of each of these components may be included. Also, although shown as integrated within device 104, some or parts of the various sensors may be external to device 104 (such as AR glasses 104b, wireless headset 1321, etc.) and accessed through input/output device interfaces 1202 either wirelessly or through a physical connection.

The antenna 1222 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 1250 or array of microphones, a wired headset (not illustrated), a wireless headset (e.g., wireless headset 1321 in FIG. 13), etc. If an array of microphones is included, approximate distance to a sound's point of origin may be performed acoustic localization based on time and amplitude differences between sounds captured by different microphones of the array.

The touch interface 1214 may be integrated with a surface of a display 1212 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The positioning module 1262 provides an interface for acquiring location information, such as information from satellite geographic positioning system(s). For example, the positioning module 1262 may include a Global Positioning System (GPS) receiver and/or a Global Navigation Satellite System (GLONASS) receiver. The positioning module 1262 may also acquire location-based information using other radio sources (e.g., via antenna 1222), such as mapping services that triangulate off of known WiFi service set identifiers (SSIDs) or cellular towers within range of the device 104.

The field sensor module 1264 provides directional data. The field sensor module 1264 may include a 3-axis magnetometer that measures magnetic fields and may serve as a compass. The field sensor module 1264 may also include a dedicated gravity sensor to determine up-and-down.

The motion sensor module 1266 provides inertial data, and may include 3-axis accelerometer and a 3-axis gyroscope.

Examples of other sensors that may be configured on the device include an electronic thermometer to measure ambient temperature and a proximity sensor to detect whether there is an object within a certain distance of the device 104.

Sensors may be communicatively coupled with other components of system via input/output (I/O) device interfaces 1202 and/or via an address/data bus 1224. The address/data bus 1224 conveys data among components of the device 104. Each component within the device 104 may also be directly connected to other components in addition to (or instead of) being connected to other components across the bus 1224.

The I/O device interfaces 1202 may connect to a variety of components and networks. Among other things, the I/O device interfaces 1202 may include an interface for an external peripheral device connection such as universal serial bus (USB), FireWire, Thunderbolt or other connection protocol. The input/output device interfaces 1202 may also support a variety of networks via an Ethernet port and antenna 1222.

The device 104 may also include a video output component for displaying images, such as display 1212. The video output component may be a display of any suitable technology, such as a liquid crystal display, an organic light emitting diode display, electronic paper, an electrochromic display, a pico projector, etc. The video output component may be integrated into the device 104 or may be separate.

The device 104 may also include an audio output component such as a speaker 1218, a wired headset (not illustrated), or a wireless headset (e.g., wireless headset 1321). Other output devices include a haptic effect generator 1292. The haptic effect generator may be of any haptic technology, including technologies to vibrate the entire device 104 (e.g., electromagnetic technologies such as vibratory motor or a coil with a central mass) and/or may comprise technologies allowing the haptic effect to be localized to a position of the touch interface 1214, such as electroactive polymers, piezoelectrics, electrostatics, subsonic audio wave surface actuation, etc. The device may also include an LED 1294 or other light emitting component to provide other visual feedback to a user other than that provided through display 1212.

As discussed above, device 104 includes controller(s)/processors 1204, memory 1206, and storage 1208. In addition, the device 104 may include a user position module 1230 and a rendering engine 1254, each of which may comprise processor-executable instructions stored in storage 1208 to be executed by controller(s)/processor(s) 1204 (e.g., software, firmware), hardware, or some combination thereof. For example, components of the user position module 1230 or rendering engine 1254 may be part of a software application running in the foreground and/or background on the device 104. The rendering engine 1254 actually renders, as in generates the appearance of, a graphical user interface. The rendering engine 1254 may render UI elements based on the user position as determined by the user position module 1230. The user position module 1230 may utilize the camera(s) 106 (or other components) to estimate a head of the selected user relative to the device 104 as discussed above.

The device 104 may also include a gesture module 1240. The gesture module 1240 may include a gesture candidate detector 1242, a gesture candidate confirmation module 1244, a feedback module 1246, and a training module 1248. The gesture module 1240 may also include storage 1252 for storing gesture motion models or other data for use by the components of the gesture module 1240. The gesture candidate detector 1242 may determine a device context (1104), receive motion data from motion sensors, detect motion (1106), pre-process motion data (1108), and determine a gesture candidate (1110) from the processed motion data. The gesture candidate confirmation module 1244 may use secondary classifiers and features to confirm a gesture (1112). The feedback module 1246 may provide feedback (1114) to a user during or after a gesture is made by a user. The training module 1248 may train the gesture detectors (1112) to recognize certain motion signatures/models corresponding to different gestures based on various contexts of the device. The motion signatures/models may be stored in storage 1252 for later reference by other components of the gesture module 1240.

As noted above, depending upon how the system is structured, other components not shown in FIG. 12 may be included as part of the device 104 certain components shown in FIG. 12 as part of a device 104 may be included in one or more other devices. For example, training module 1248 may be located in a remote server, where the remote server may analyze various data to create and/or modify motion signatures/models. Those models may then be loaded onto a device 104 through various methods. In another aspect, both the server and a device may have a training module 1248 and a specific device may be configured to update its own models to reflect specific behavior of a user of the specific device 104.

To detect a tilt gesture, a device may be configured with a model describing the output of motion sensors of a device (accelerometer, gyroscope, etc.) that correspond to one or more examples of the tilt gesture. Other data and/or output from other sensors, such as magnetometers, head tracking data, microphones, etc. may be used to form the model if such data/output assists in detecting tilt gestures. The model may be created during a training phase and may be based on multiple examples of executions of tilt gestures during real-world examples so that the model may follow tilt gestures that are intended by users, thus allowing a device using the model to differentiate from user intended tilt gestures from other device motions.

Prior to comparing incoming motion sensor data to motion models, a device component, such as the gesture candidate detector 1242 may perform some preprocessing of the motion data. This may involve passing the motion data through one or more filters to smooth the data. The filters may include, for example, a band-pass filter, low-pass filter, Kalman filter using physiological models of the human hand, wrist, and arm, etc. The filters may remove from the motion sensor data any motion that is not the result of a human moving the device. Examples of such motions may include, for example, vibration of a device due to riding in a vehicle, etc. Such motion data acts like noise when attempting to detect a gesture and is preferably removed performing gesture detection. Further, the system may average recent motion data samples (for example, take a moving average of the last five samples) in order to provide additional smoothing to control for anomalous motion data. Other pre-processing may also be performed. The pre-processed motion data may then be compared to motion models to detect a gesture.

Figure 13:
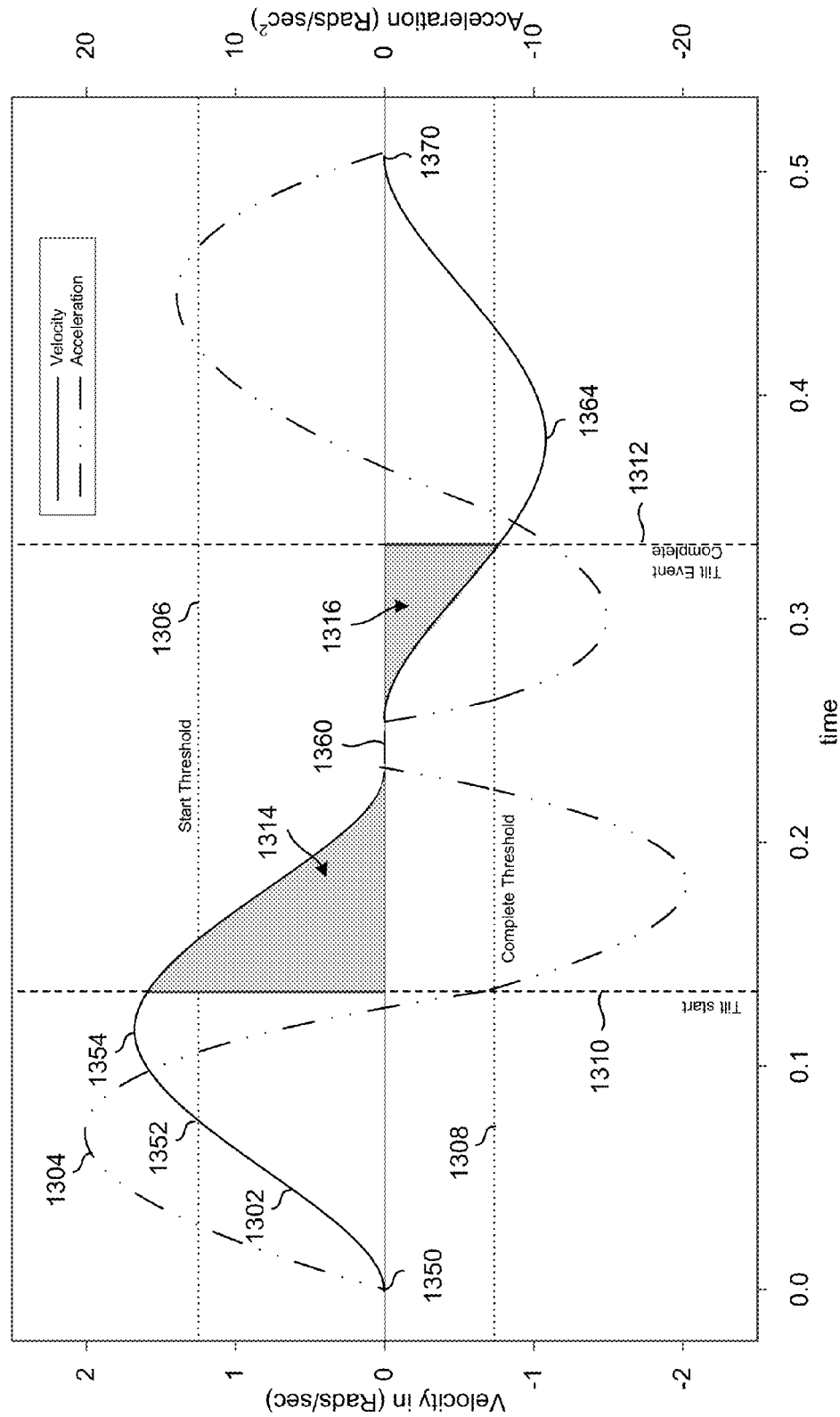
FIG. 13 is a graphical representation of example motion data that may be used in accordance with various embodiments.

An example of motion data that may be detected during a tilt gesture is shown in FIG. 13. FIG. 13 shows a graph 1300 illustrating motion of a device (as detected by one or more motion sensors) about a single axis during a single tilt gesture, namely rotation of a device about an axis in one direction followed within a certain time by a rotation of the device in the other direction about the axis to return to the original position. This graph may represent a tilt gesture about the X axis, Y axis, or Z axis. While the precise values may change from one tilt gesture to another, graph 1300 generally describes motion of a device during a tilt gesture. The motion data, such as data describing motion similar to that of FIG. 13, may be sent from sensors in the form of a signal, such as a rotational signal, that may include a vector (for example a vector including magnitude and direction of rotation) as well as time information.

As shown in graph 1300, time in seconds is shown along the bottom axis. Velocity in Rads/sec is shown by line 1302. Acceleration is shown by line 1304. Actual motion of the device may be calculated by finding the area under the velocity line. For example, as motion begins at point 1350, the device starts to pivot around its axis. The device stops turning, and reaches maximum displacement from its original position at around point 1360. The device then starts to pivot in the opposite direction (and heading back to its original position) at point 1360, returning to its original position at around point 1370. Thus the area between velocity line 1302 and 0 from point 1350 to point 1360 (representing motion in one direction around the axis) should be approximately equal to the area between 0 and velocity line 1302 from point 1360 to point 1370 (representing motion in the other direction around the axis). Graph 1300 shows motion starting in one direction and then heading the other. Depending on the configuration of the axes, motion may be recorded in the positive direction first (as illustrated) or in the negative direction first (which would result in the same graph 1300 only flipped vertically).

During runtime, a gesture candidate detector 1242 will compare the motion of the device to an expected motion signature corresponding to the tilt gesture. The gesture candidate detector 1242 may look for a motion wave form describing the device rotating outward about an axis and then moving back in a similar manner to that shown in graph 1300. The overall motion detected should be performed within a specified time period in order be classified as a tilt gesture. Similarly, each individual component of the overall motion should be performed within a specified time period for the particular component. For example, the gesture candidate detector 1242 may check how far the motion goes out about the axis, how far it comes back, the size of the motion, how smooth (or crooked) the motion is about the axis, how consistently the motion moves on the axis on the way out and/or whether the axis changed on the way back, how long it took to reach a stable velocity, how long the entire motion took, etc. Each of those motion components should match the motion and specified time periods for each component, within the thresholds established in the motion signature. The gesture candidate detector 1242 may also check motion on other axes to ensure that a tilt gesture on the single axis was intended by the user. If a large enough motion activity is found on other axes a tilt gesture may not have been what was intended.

The gesture candidate detector 1242 may continuously consider motion data as it comes from the sensors. By doing so, the gesture candidate detector 1242 may detect a gesture with low latency. As the gesture candidate detector 1242 evaluates incoming motion data, the gesture candidate detector 1242 may operate a state machine, comparing the motion data as it comes in to the model of the tilt gesture. The gesture candidate detector 1242 may track the motion as it reaches certain thresholds, and progresses along different states from the beginning to the end of the tilt gesture. Thresholds may include acceleration thresholds, velocity thresholds, distance travelled thresholds, or the like. For example, as the motion progresses the motion hits a minimum velocity, then moves a certain distance, then reverses the direction of the device, and then again hits a minimum velocity and motion for the motion to be considered a successful tilt gesture.

Figure 14:
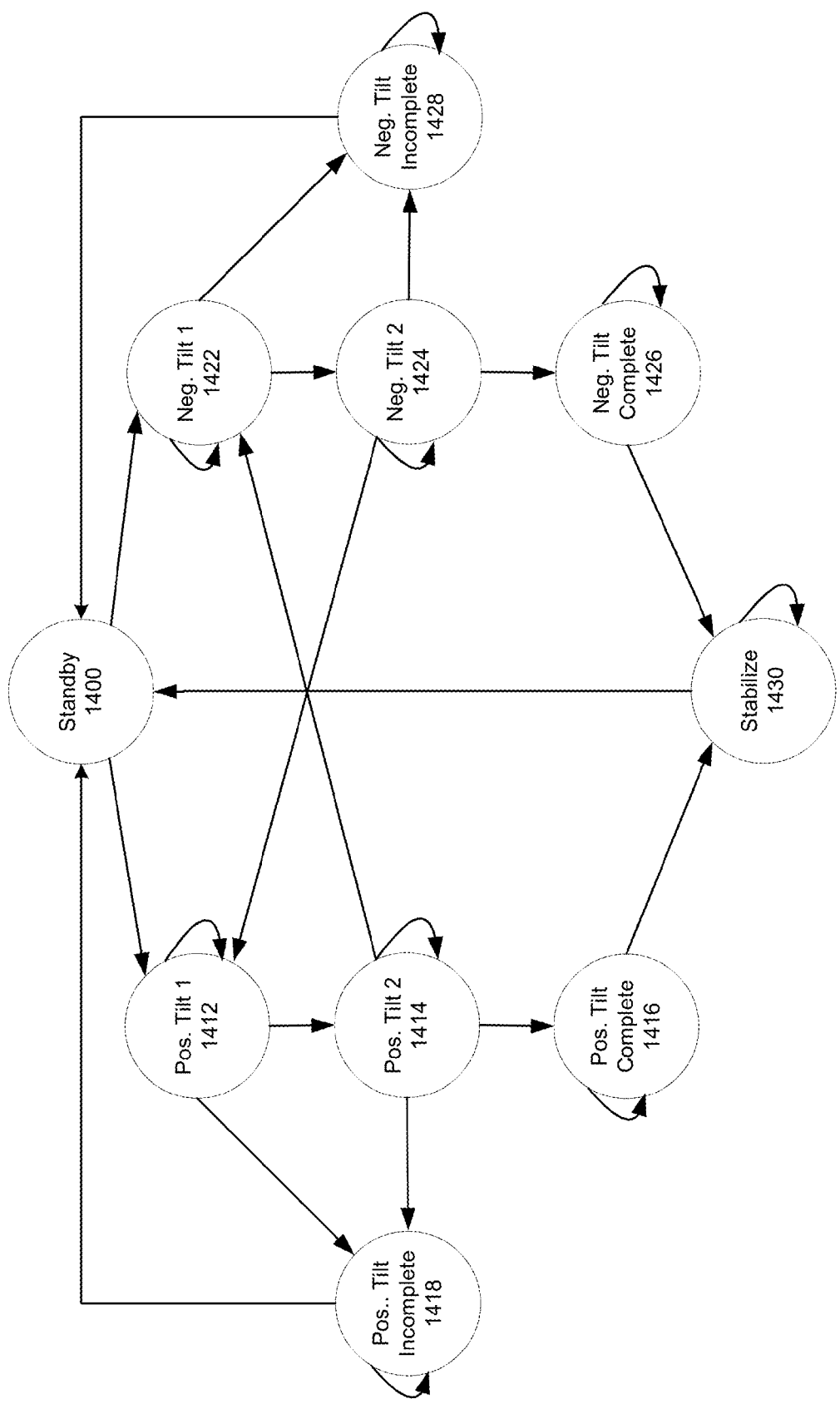
FIG. 14 is an example of a state machine that may be used in accordance with various embodiments.

An example state machine with a number of states is shown in FIG. 14. A heuristic algorithm may be used to traverse the state machine. At state 1400 the device is standby, for example in between gestures, at rest, or the like. The left side of the state machine shows states positive tilt 1 (1412), positive tilt 2 (1414), positive tilt complete (1416), and positive tilt incomplete (1418). The right side of the state machine shows states negative tilt 1 (1422), negative tilt 2 (1424), negative tilt complete (1426), and negative tilt incomplete (1428). The final state stabilize 1430 is the state the device enters after a tilt is completed before the device reenters the standby state 1400.

When the gesture candidate detector 1242 detects motion that represents a beginning of a potential tilt gesture, it moves from standby 1400 to positive tilt 1 (1412). Positive tilt 1 (1412) thus represents the first stage of detecting a positive tilt (for example, the motion data meeting certain thresholds). Positive tilt 2 (1414) represents the second stage of detecting a positive tilt (for example, the motion data meeting certain further thresholds). When the final thresholds for detecting a positive tilt gesture is met, the device may enter positive tilt complete state (1416) and declare a positive tilt. If at any point after reaching the positive tilt 1 state (1412) but before declaring a completed positive tilt, the gesture candidate detector 1242 determines that the incoming motion does not represent a tilt gesture, the device may enter the positive tilt incomplete state (1418) and then eventually return to standby 1400. Transitions between states may be determined by evaluating the incoming motion data (direction, speed, acceleration, etc.), whether the motion data passes certain thresholds (based on strength, time, etc.), the activity of certain timers, head detection, confidence calculations, or other factors.

The positive and negative sides of the state machine operate in a similar manner only that a positive tilt is a tilt in one direction around an axis (for example, clockwise) and a negative tilt is a tilt in the other direction (for example, counter-clockwise) around the axis. Accordingly, only the positive side of the state machine is discussed below, but the descriptions for the positive states may apply to the negative states as well. An example for traversing the state machine in the positive direction is described below.

When the device crosses a certain threshold (for example, in FIG. 13 point 1352 shown crossing as start threshold 1306) and the device reaches a certain peak velocity about an axis (shown in FIG. 13 as point 1354), if a confidence score is sufficiently high, the device may move from the standby state 1400 to state positive tilt 1 (1412).

The confidence score may indicate how confidence the system is that the motion being detected is a tilt gesture. The confidence score may be determined based on a number of factors. For example, the confidence score may include an average of the absolute value of the velocity experienced by the device over each axis over a certain number (e.g., 5) of recent samples of motion data. The motion about the current axis under consideration may be compared to the total motion to create a motion ratio. The confidence score may be based on the motion ratio. For example, if the system is trying to determine if a gesture is being performed about an X axis, then the motion ratio is motion about the X axis compared to total motion. The higher the motion ratio, the more the motion is concentrated about the X axis, and the higher the confidence score will be.

If the above factors are met, the device moves into positive tilt 1 (1412), declares a tilt start, shown in FIG. 13 as line 1310, and starts a tilt gesture timer. Once the device is detected to have changed direction about the axis in question (for example at point 1360 in FIG. 13) satisfying the expected motion and time set forth in the motion signature, the device may consider positive tilt 1 (1412) completed and may enter state positive tilt 2 (1414). The confidence scores may be averaged while in states positive tilt 1 (1412) and positive tilt 2 (1414). If, at any point while in state 1412 or 1414, motion is detected that strays too far from the motion model, the confidence score drops too low, other significant non-tilt data is detected, the tilt gesture timer expires, or other failure conditions occur, a tilt failure may be declared and the device may move to state positive tilt incomplete 1418. Once the tilt gesture timer expires, the device may return to standby 1400 from tilt incomplete 1418.

Under certain conditions, the state machine may move from positive tilt 2 (1414) to negative tilt 1 (1422). This may occur when the user "winds up" before tilting the device, thus drawing the device back slightly in one direction before performing a tilt in the other direction. Thus the device initially detects movement in the positive direction, and then the movement changes to the negative direction, where the movement in the negative direction is significantly greater than the initial movement in the positive direction. Thus the device may determine that a negative tilt more closely matches the motion data and may move from positive tilt 2 (1414) to negative tilt 1 (1422).

When the motion data indicates the motion has reached (or has approached) a negative peak, has reached or passed a tilt complete threshold (shown in FIG. 13 as line 1308), the confidence score is sufficiently high, and the motion has satisfied the expected motion and time set forth in the motion signature, the device may consider positive tilt 2 (1414) completed and may declare a tilt event complete (for example at line 1312) and may move to state positive tilt complete 1416. Once the device motion drops below a certain value the device may move from state 1416 to state stabilize 1430. If the motion of the device stays within a low range for a specified period of time the device may return from state stabilize to state standby 1400.

Although described in reference to a single state machine, multiple state machines may be processed concurrently, and may be at different stages at different times based on the motion data. For example, if motion in one direction around an axis is detected, a first state machine may be traversed. When motion in the other direction is detected, the first state machine may alter its state in addition to a second state machine being traversed. The current state of each state machine may be associated with a score (such as a confidence score) where the state with the highest score (or the score above a certain threshold) may be the state relied on by the device for declaring a tilt gesture.

As shown in FIG. 13, a tilt gesture may be declared complete (i.e., at line 1312) even if a device has not crossed the peak return velocity, shown at 1364. For example, if a device has moved past a certain point on an axis and is on its way back, even if the device has not fully returned, if gesture candidate detector 1242 has a sufficient confidence that the device is likely to return and the entire motion is likely to be a gesture, a tilt event complete may be declared. Various factors that may be determined in training may influence when a tilt gesture is declared. For example, the motion of the device between when a tilt gesture start is declared and the device changes direction has a certain value (indicated by shaded region 1314). The motion of the device after the change of direction also has a certain value (indicated by shaded region 1316). Assuming no fail conditions are activated, when the shaded region 1316 reaches a certain percentage of shaded region 1314 (thus resulting in a high end confidence score), a tilt gesture event complete may be declared. Other conditions may also result in a high end confidence score, thus resulting in declaration of a tilt event complete and moving to state 1416.

Using a state machine, such as that illustrated in FIG. 14 may allow the device to detect gestures within motions with reduced latency, allowing the device to declare a tilt gestures even when the gesture is not yet fully complete. The state machine also allows specific control over when intermediate steps during a tilt gesture may be reached, allow actions to be taken at those points, for example providing user feedback as explained below. Motion models and thresholds may be set in the training stage discussed below. Certain thresholds that may be used in comparing a motion model to incoming motion data and navigating a state machine may include (but are not limited to):

Start velocity. That is a point past which a peak velocity around an axis during an initial motion of a gesture must pass before a potential tilt gesture is declared (for example start threshold 1306 shown in FIG. 13).

Complete velocity. That is a point past which a peak velocity around an axis during a return motion of a gesture must pass before a potential tilt gesture is declared (for example start threshold 1308 shown in FIG. 13).

Minimum motion for a tilt gesture.

Start confidence. The confidence score sufficient to move from standby 1400 to positive tilt 1 (1412).

End confidence. The confidence score sufficient to move from positive tilt 2 (1414) to positive tilt complete 1416.

Maximum gesture time. This is the maximum time allowed before a fail condition is activated and the positive tilt incomplete (1418) state is entered. This value may be compared to the gesture timer.

Stable velocity. That is, a velocity below which the device motion must fall in order to consider the device stable.

Incomplete time. This is the period of time after a gesture is detected and rejected that motion data is ignored, thus allowing the device to complete its non-gesture motion before attempting to detect a new gesture.

Correlation. This measures how closely a device's outward motion vector correlates to its return motion vector. If the vectors do not correlate properly, a failure condition may be activated.

Declaration of a tilt gesture by the gesture candidate detector 1242 as describe above may be, however, only the first step in declaring a gesture. For example, after a tilt gesture is declared by the gesture candidate detector 1242 (for example by entering state 1416), the gesture candidate confirmation module 1244 may perform a number of checks to confirm that the declared tilt gesture should indeed be treated like a gesture. The gesture candidate detector 1242 may be configured to allow most conceivable tilt gestures through, thus allowing the gesture candidate confirmation module 1244 to act as a secondary filter for potentially motions to actually be confirmed as gestures, thus removing any false positives. By taking this multi-stage approach, the device may weed out obvious non-gestures using the gesture candidate detector 1242 and wait on executing intensive computing tasks to confirm gestures for the later gesture candidate confirmation module 1244, thus conserving computing resources.

The gesture candidate detector 1242 may pass the gesture candidate confirmation module 1244 a variety of output data including the raw or smoothed motion data as analyzed by the gesture candidate detector, how close the motion data came to meeting the thresholds, how the state machine operated while considering the gesture, or other information. The gesture candidate confirmation module 1244 may be a machine learning based classifier that is specifically trained on outputs of the gesture candidate detector 1242, along with a number of other data points that may not necessarily be considered by the gesture candidate detector 1242, to confirm whether a motion is actually a tilt gesture.

The gesture candidate confirmation module 1244 may be trained on many different data variables, called features, that are intended to identify when a user actually intended a tilt gesture. The features may be based on motion data provided by one or more sensors, or based on other data regarding the operation of the device, the context, and/or other considerations. The features provide additional information that may be used to confirm whether the motion of the device corresponds to a tilt gesture. Features that may be considered by the gesture candidate confirmation module 1244 include, but are not limited to, long-term averages of motion data, long term averages of the derivatives of motion data, fast-Fourier transforms (FFTs) of the motion data, interaction of motion over different axes, output from a head tracking system during various points before or during a motion that may be a gesture, time of last head detection, direction of last head detection, category of motion of the user during a potential gesture (for example, in a car, on a bicycle, etc.), changes between motion data events, orientation of the device, hand(s) the user is operating the device with, what applications are being operated on the device (for example 2D or 3D), other user activity, device context information, or others. Features may be represented by data structured as data strings, which may be processed by the secondary classifiers using string compare algorithms. The gesture candidate confirmation module 1244 may use a variety of machine learning techniques such as boosted decision stumps, neural networks, etc.

If a device's sensors are capable of detecting what muscles are being used by the user when moving the device (myography), that information may be used by the gesture module 1240 to detect a gesture. For example, if the device itself were equipped with sensors that could isolate motion of certain muscles of the user, of if the device were connected to other devices that could do so (for example a wearable device like a smart watch, etc.), the device may identify when specific muscles are moving (such as detecting a wrist pronation in the hand holding the device) that may assist in identifying a gesture. If available, such myographic inputs may be considered by the gesture candidate detector 1242 and/or by the gesture candidate confirmation module 1244 as well as incorporated into models, thresholds, and features as trained by the training module 1248 discussed below.

As many different motion events, that may or may not be gestures, may be described in many different ways using the features considered by the gesture candidate confirmation module 1244 or the thresholds used by the gesture candidate detector 1242, the respective modules may be trained to recognize gestures based on various inputs of motion data (including motion models), features, etc. The training may be done by a training module 1248. The training may occur ahead of time based on one or more training data sets and/or may be dynamic in that it incorporates behavior of a user to re-train the gesture candidate detector 1242 and/or gesture candidate confirmation module 1244 after deployment. Training may also take place on device 104 or on a remote server or device, with the results then pushed to device 104.

As an example, values for the thresholds used by the gesture candidate detector 1242 may be determined using a genetic algorithm where the genetic algorithm is run against a large training set of sample gesture/motion data, and is then cross validated on a smaller set of data. A given set of thresholds may be determined by combining precision, recall, and an estimate of the physical effort to perform the gesture. The training module 1248 may also classify subsets of input data and use a search algorithm within those subsets to arrive at values for the thresholds. Different threshold values may be determined for different device contexts. For example, thresholds may be different depending on how the user is moving, what application the device is running, what orientation the device is in, what axis is the tilt gesture being performed around, what user is operating the device, etc. The various thresholds for various contexts may be determined by the training module 1248, stored in storage 1252, and called on by the gesture candidate detector 1242 when analyzing incoming motion data to detect a candidate gesture. The various thresholds may be re-trained based on the habits of particular users.

How the gesture candidate confirmation module 1244 should analyze the various features may also be trained by the training module 1248. For example, the output of a trained gesture candidate detector 1242 (along with other data of a training set) may be featurized based on the features that may be considered by the gesture candidate confirmation module 1244. Decision stumps may be generated using boosted training against the featurized candidate gestures. The output may be cross-validated or otherwise manipulated to train the gesture candidate confirmation module 1244 on what candidate gestures from the gesture candidate detector 1242 should be rejected and which should be confirmed, based on the features. The features themselves may describe the device context thus enabling the gesture candidate detector 1242 to base its decisions on the particular operating conditions and context of the device. The training module 1248 and/or the gesture candidate confirmation module 1244 may rely on a number of machine learning techniques, including those described above in relation to the position-based UI.

As part of the gesture detection/activation, the device may provide feedback to the user to assist the user in executing tilt gestures that are likely to be recognized by the device, and to indicate to the user as the gesture detection proceeds in the device. A gesture module 1240 may include a feedback module 1246 for such purposes. The feedback module may communicate with other components of the device (such as the motion sensors 1266, gesture candidate detector 1242, rendering engine 1254, haptic effect generator 1292, etc.) to assist in providing the user feedback as part of a gesture. For example, a user interface (UI) may render the effect of a gesture based on the speed with which the user executed the gesture. For example, if a tilt gesture called for an icon on the UI to move from one place to another, the speed of the icon may be based on the speed of the user's motion of the device during the gesture. In one embodiment, the speeds may match (i.e., fast to fast). In another embodiment the icon animation may be faster than the actual gesture motion as a way to encourage the user to speed up their physical gestures with the device. In another embodiment, the force used by the user may be reflected in the UI. For example, for users that use excessive force when gesturing, the UI may animate an icon to bounce to indicate that the gesture was overdone. Many other options are possible.

In other embodiments, the feedback module 1246 may provide feedback to the user (through one more outputs such as haptics, LED, display 1212, speaker 1218, etc.) as the device is being moved during a gesture. For example, as motion of the device enters the positive tilt 1 state (1412) a feedback, such as a haptic vibration, may be pushed to the user to indicate to the user that he/she may bring the device back. The feedback indication may be pushed from the feedback module 1246 directly to the output component (for example haptic effect generator 1292) or may be pushed to a UI layer for display to the user.

Once a gesture has been detected, confirmed, and completed, an indicator of the application may be sent to the OS, application, or other process on the device that may execute one or more functions corresponding to the gesture. The indicator may include not only the identity of the gesture performed, but also additional data such as time information about when the gesture started and stopped, data regarding the actual motion of the gesture (force, speed, distance traveled about the axis, etc.), or other information. This information may be used by the OS, app, etc. to animate the UI accordingly or otherwise execute the function in a manner consistent with the motion of the gesture. Thus the UI may be altered based on the motion that described the gesture.

Figure 15:
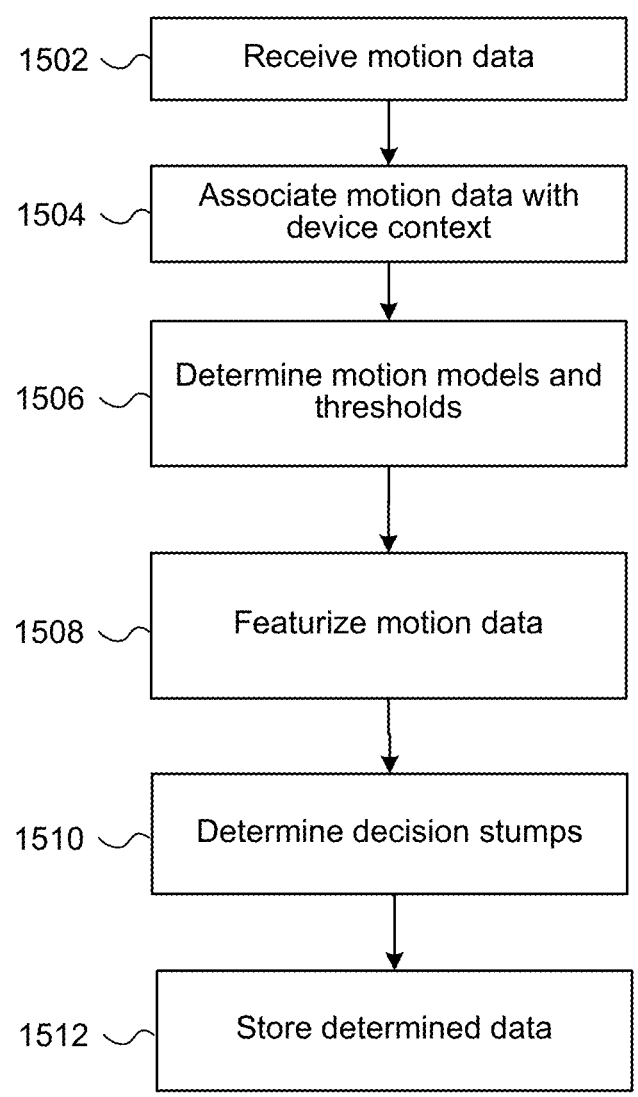
FIG. 15 shows an example method for training gesture detector components in accordance with various embodiments.

FIG. 15 shows steps for training gesture detector components, for example using training module 1248. The training module 1248 may receive motion data (1502). The motion data may be from a training data set of gestures and/or may include runtime data taken by a user of the device 104 to train the system during runtime. The training module 1248 may also receive other data, such as context data describing the device context. Such context data may identify circumstances of the particular gestures associated with the motion data such as an application running on the device, an orientation of the device, a hand being used to hold the device, head position relative to the device, data from other sensors (microphone, field sensors, etc.), or other information. The training module 1248 may associate the motion data with the device context (1504). The training module 1248 may determine motion models and corresponding thresholds (1506) that may be used by a gesture candidate detector 1242. The training module 1248 may also featurize the motion data and/or other data received (1508) and determine decision stumps (1510) or other information that may be used by gesture candidate confirmation module 1244. Other machine learning techniques beyond boosted decision stump may also be used. The motion models, thresholds, decision stumps, and other data determined by the training module 1248 may then be stored (1512) for use by the other components. For example, stored in storage 1252. In one embodiment the training module 1248 may be separate from a device 104, for example located on a remote server. In such an embodiment data output from the training module may be disseminated to one or more devices for example when the devices are initially built/configured, over a network 1280 after deployment, or in some other manner.

Figure 16:
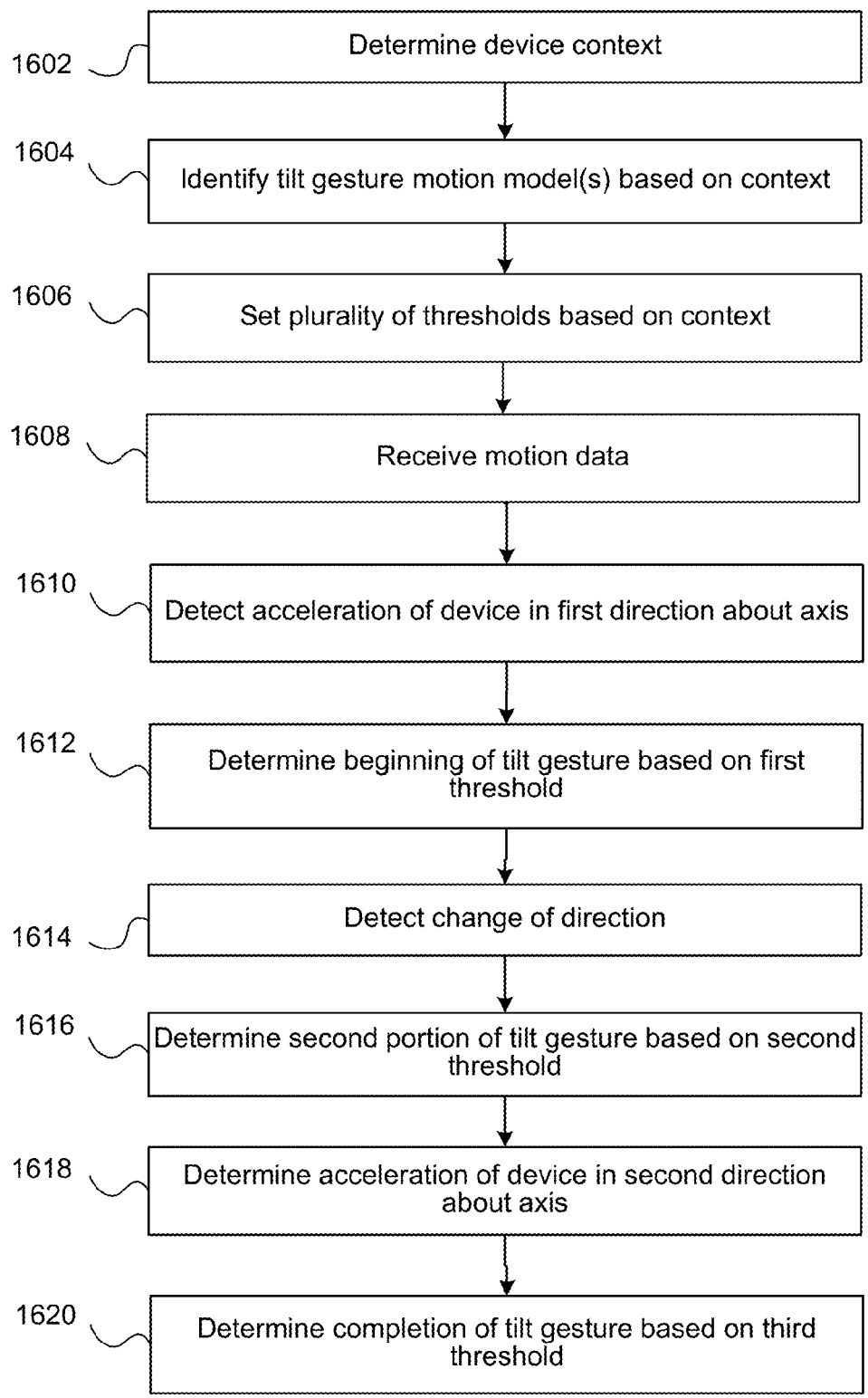
FIG. 16 shows an example method for detecting a gesture in accordance with various embodiments.

FIG. 16 shows steps for determining a gesture, for example using a gesture candidate detector 1242. A gesture candidate detector 1242 may determine a device context (1602), for example by receiving data describing the device context from one or more other components of a device. The gesture candidate detector 1242 may identify tilt gesture model(s) (1604) and a plurality of thresholds (1606) based on the context. For example, the gesture candidate detector 1242 may identify one or more models and thresholds (and potentially other data) in the storage 1252 that correspond to the device context and that may be used to detect a gesture in incoming motion data. In another embodiment the model(s), thresholds, and/or other data may be identified by a different component and sent to the gesture candidate detector 1242. The context may include, for example, the orientation of the device, an application running on the device, a hand holding the device, and/or other information. The motion model may include, for example, a sample wave form such as that shown in FIG. 13) describing motion of a device against which the gesture candidate detector 1242 may compare incoming motion data. The motion model may be based on the context, for example showing different wave forms for different tilt gestures based on the context. The plurality of thresholds may include first, second, third, and possibly more thresholds, for example a start velocity threshold, complete velocity threshold, confidence threshold(s), time thresholds, etc. One or more of the plurality of thresholds may be based on the context. The thresholds may correspond to certain motion models. Certain thresholds may be the same or may be different across motion models.

The gesture candidate detector 1242 may receive motion data (1608), for example from motion sensors of a device 104. The gesture candidate detector 1242 may then detect first acceleration of the device in a first direction around an axis, causing motion of the device in the first direction (1610). The gesture candidate detector 1242 may determine a beginning of a tilt gesture (1612) based on a first threshold, that may be a velocity threshold, confidence threshold, or other threshold. The gesture candidate detector 1242 may then detect a change in direction (1614) of the acceleration or motion of the device 104. The gesture candidate detector 1242 may then determine a second portion of a tilt gesture based on a second threshold (1616). The second threshold may be a direction threshold, where the second threshold is exceeded when the acceleration of the device changes direction. The second threshold may also be a confidence threshold. The gesture candidate detector 1242 may then detect second acceleration of the device in a second direction around the axis, causing motion in the second direction (1618). The second direction may be the rotational direction around the axis opposite from the first direction. The device then may determine completion of the tilt gesture based on a third threshold (1620). The third threshold may include a threshold regarding motion in one direction compared to motion in a second direction. The third threshold may also be a confidence threshold.

Figure 17:
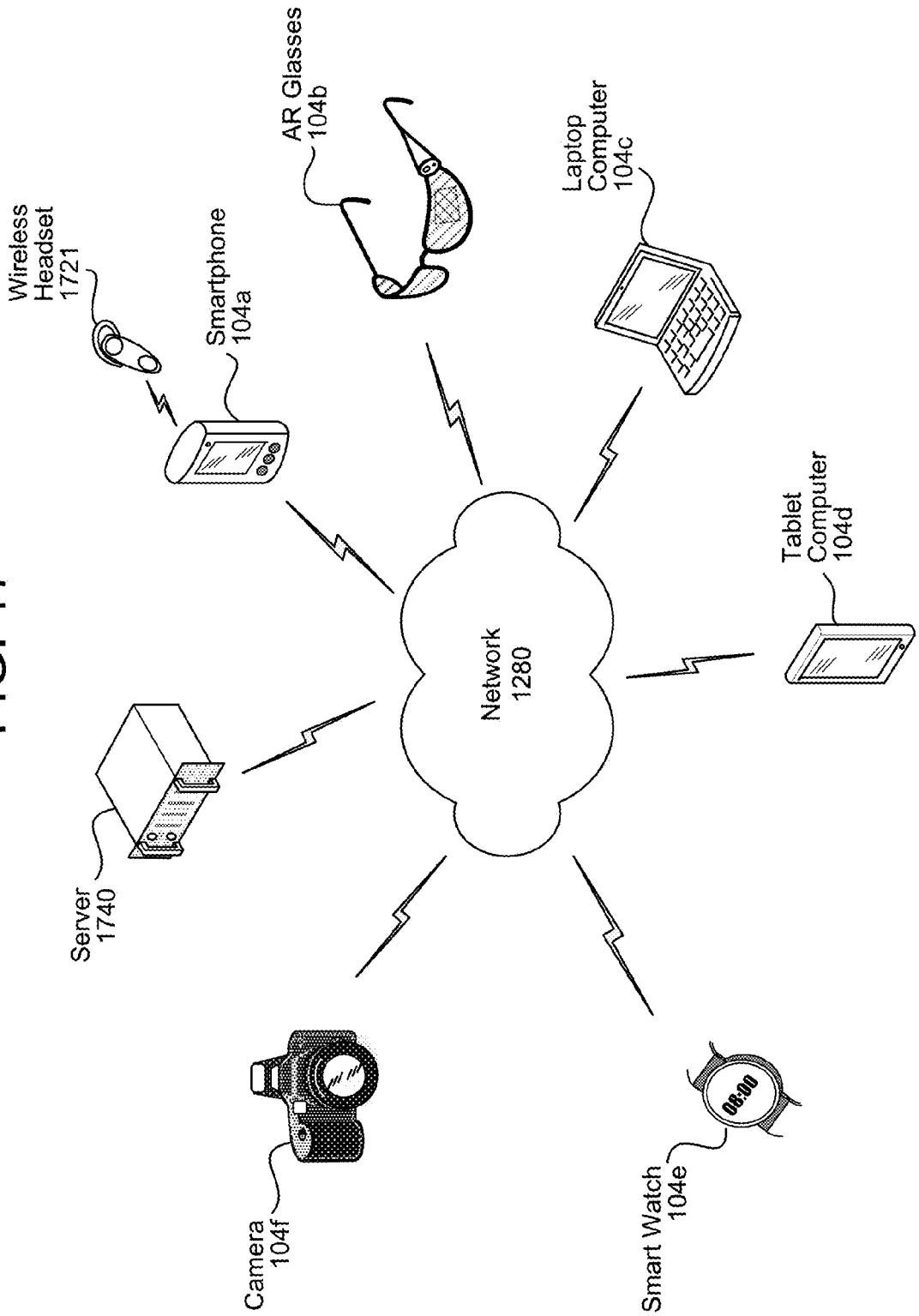
FIG. 17 illustrates an example of a computer network system.

Referring to FIG. 17, different mobile devices 104*a* to 104*e* may contain different components of the system and the devices may be connected over a network 1280 to one or more servers 1740. For example, the server 1740 may communicate with a smartphone 104*a* or tablet computer 104*d* to provide information models, threshold, decision stumps, etc. to be used in gesture recognition. Similarly the devices 104*a*, 104*d*, etc. may push motion information or training data to server 1740 for updating training or other data that is stored remotely.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for detecting a tilt gesture, the method comprising:
   determining an identity of a user of the device;
   identifying, based on the identity, a motion model describing expected outputs from a motion sensor of the device when the device executes a tilt gesture by rotating back and forth about an axis of the device within a predefined period of time, the motion model comprising a plurality of thresholds, the plurality of thresholds comprising a first threshold, a second threshold, and a third threshold;
   detecting, based on a first output of the motion sensor, a first acceleration of the device in a first direction about the axis of the device, wherein the motion sensor comprises one or more of an accelerometer or a gyroscope;
   determining completion of a first stage of the tilt gesture based on a first comparison of the first output to the first threshold, the first threshold comprising a minimum rotational velocity threshold;
   detecting, based on a second output of the motion sensor, a second acceleration of the device in a second direction about the axis of the device, wherein the second direction is opposite the first direction;
   determining completion of a second stage of the tilt gesture based on a second comparison of the second output to the second threshold, the second threshold comprising a zero velocity threshold;
   generating a third output representing rotational distance traveled by the device, the third output based on the first output and the second output;
   determining completion of a tilt gesture based on a third comparison of the third output to a third threshold, the third threshold representing a minimum rotational distance required to be traveled by the device;
   sending an indication of the completion of the tilt gesture to an application; and executing a function based on the tilt gesture by the application.

2. The computer-implemented method of claim 1, further comprising determining a context of a device, the context comprising at least one of an orientation of the device or an application running on the device, wherein the motion model is identified based on the context of the device, the motion model describing expected outputs from the motion sensor when the device executes a tilt gesture in the determined context.

3. A device, comprising:
   at least one motion sensor;
   at least one memory; and
   at least one processor coupled to the at least one memory, the at least one processor being configured for:
      determining an identity of a user of the device;
      receiving a first rotation signal representing a first rotation of the device in a first direction about a first axis of the device;
      comparing the first rotation to a first threshold, wherein the first threshold is based on the identity;
      determining completion of a first stage of a tilt gesture based at least in part on the comparing of the first rotation to the first threshold;
      receiving a second rotation signal representing a second rotation of the device in a second direction about the first axis, the second direction being opposite the first direction;
      comparing the second rotation to a second threshold, wherein the second threshold is based on the identity; and
      determining completion of the tilt gesture based at least in part on the comparing of the second rotation to the second threshold.

4. The device of claim 3, wherein:
   the determining completion of the first stage is further based at least in part on a first confidence score; and
   the determining completion of the tilt gesture is further based at least in part on a second confidence score.

5. The device of claim 4, wherein:
   the first confidence score is based at least in part on the first rotation; and
   the second confidence score is based at least in part on the second rotation.

6. The device of claim 3, wherein the at least one processor is further configured for:
   determining a context of the device, the context comprising at least one of a device orientation, an application running on the device, a position of a head of the user, and whether the device is being operated by a left hand or a right hand, wherein the first threshold and second threshold are further based on the context.

7. The device of claim 3, wherein the at least one motion sensor comprises at least one of an accelerometer, a gyroscope, or a magnetometer configured to generate at least one of the first rotation signal or the second rotation signal.

8. The device of claim 3, wherein the at least one processor is further configured to output an indicator to the user based on determining the first stage of the tilt gesture.

9. The device of claim 8, wherein the indicator comprises one of an audio indicator or a haptic indicator.

10. The device of claim 3, further comprising a display screen, wherein the at least one processor is further configured to execute a function corresponding to the tilt gesture, the function resulting in a menu user interface appearing on a display screen of the device.

11. The device of claim 3, wherein the first rotation occurs at a first time and the second rotation occurs at a second time, the second time being after the first time.

12. A method comprising:
   determining an identity of a user of the device;
   receiving a first rotation signal representing a first rotation of the device in a first direction about a first axis of the device;
   comparing the first rotation to a first threshold, wherein the first threshold is based on the identity;
   determining completion of a first stage of a tilt gesture based at least in part on the comparing of the first rotation to the first threshold;
   receiving a second rotation signal representing a second rotation of the device in a second direction about the first axis, the second direction being opposite the first direction;
   comparing the second rotation to a second threshold, wherein the first threshold is based on the identity; and
   determining completion of the tilt gesture based at least in part on the comparing of the second rotation to the second threshold.

13. The method of claim 12, wherein:
   the determining completion of the first stage is further based at least in part on a first confidence score; and
   the determining completion of the tilt gesture is further based at least in part on a second confidence score.

14. The method of claim 13, wherein:
   the first confidence score is based at least in part on the first rotation; and
   the second confidence score is based at least in part on the second rotation.

15. The method of claim 12, further comprising determining a context of the device, the context comprising at least one of a device orientation, an application running on the device, a position of a head of the user, and whether the device is being operated by a left hand or a right hand, wherein the first threshold and second threshold are based on the context.

16. The method of claim 12, wherein at least one of the first rotation signal or the second rotation signal is generated by at least one motion sensor comprises at least one of an accelerometer, a gyroscope, or a magnetometer.

17. The method of claim 12, further comprising outputting an indicator to the user based on determining the first stage of the tilt gesture.

18. The method of claim 17, wherein the indicator comprises one of an audio indicator or a haptic indicator.

19. The method of claim 12, further comprising executing a function corresponding to the tilt gesture, the function resulting in a menu user interface appearing on a display screen of the device.

20. The method of claim 12, wherein the first rotation occurs at a first time and the second rotation occurs at a second time, the second time being after the first time.

* * * * *